(12) United States Patent
Souda

(10) Patent No.: US 12,271,296 B2
(45) Date of Patent: Apr. 8, 2025

(54) INFORMATION PROCESSING DEVICE AND TEST METHOD FOR EVALUATING DATA INTEGRITY

(71) Applicant: Kioxia Corporation, Tokyo (JP)

(72) Inventor: Noriyasu Souda, Hiratsuka Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 127 days.

(21) Appl. No.: 18/176,943

(22) Filed: Mar. 1, 2023

(65) Prior Publication Data

US 2024/0037024 A1 Feb. 1, 2024

(30) Foreign Application Priority Data

Jul. 28, 2022 (JP) ................ 2022-120470

(51) Int. Cl.
*G06F 12/02* (2006.01)
*G06F 3/06* (2006.01)

(52) U.S. Cl.
CPC .......... *G06F 12/023* (2013.01); *G06F 3/0619* (2013.01); *G06F 3/0655* (2013.01); *G06F 3/0679* (2013.01); *G06F 2212/251* (2013.01)

(58) Field of Classification Search
CPC .... G06F 3/0619; G06F 3/0655; G06F 3/0679; G06F 12/023; G06F 12/0246; G06F 2212/1016; G06F 2212/1032; G06F 2212/251; G06F 2212/7201; G06F 2212/7204; G06F 2212/7208
See application file for complete search history.

(56) References Cited

U.S. PATENT DOCUMENTS

| | | | |
|---|---|---|---|
| 7,574,459 B2 | 8/2009 | Sen et al. | |
| 11,307,931 B1 | 4/2022 | Bert | |
| 2006/0233077 A1* | 10/2006 | Yu | G11B 27/36 |
| 2022/0206952 A1* | 6/2022 | Yuan | G06F 3/067 |

FOREIGN PATENT DOCUMENTS

| | | | |
|---|---|---|---|
| JP | 2001-092724 A | 4/2001 | |
| JP | 5367770 B2 | 12/2013 | |

* cited by examiner

*Primary Examiner* — Larry T MacKall
(74) *Attorney, Agent, or Firm* — Foley & Lardner LLP

(57) ABSTRACT

A processor stores write data to be written to a storage area. The processor embeds a zone identifier for identifying a zone including consecutive logical addresses, and a sequence number for each logical address in a head or an end of a sector of the write data. The processor issues a zone append command for designating a head logical address of the zone and a size of the write data, instead of designating a logical address corresponding to the storage area to which the write data is written, and requesting writing of the write data to the storage area corresponding to the zone. The processor acquires a logical address corresponding to the storage location to which the write data is written. The processor stores the zone identifier and the sequence number in an expected value table storing expected values of read data corresponding to the zone for each logical address.

16 Claims, 28 Drawing Sheets

FIG. 4

| Zone | LBAs |
|---|---|
| ZONE #0 | LBA 0, LBA 1, ..., LBA m-2, LBA m-1 |
| ZONE #1 | LBA m, LBA m+1, ..., LBA n-2, LBA n-1 |
| ... | ... |
| ZONE #x-1 | LBA y, LBA y+1, ..., LBA z-2, LBA z-1 |

FIG. 12

DATA COMPARE MANAGEMENT ROUTE TABLE ~2241

| ZONE NUMBER | ITEM |
|---|---|
| — | DATA COMPARE MANAGEMENT TABLE HEADER |
| — | TEMPORARY EXPECTED VALUE TABLE ADDRESS |
| 0x00 | DATA COMPARE MANAGEMENT TABLE ENTRY |
| 0x01 | DATA COMPARE MANAGEMENT TABLE ENTRY |
| 0x02 | DATA COMPARE MANAGEMENT TABLE ENTRY |
| ... | ... |
| N-2 | DATA COMPARE MANAGEMENT TABLE ENTRY |
| N-1 | DATA COMPARE MANAGEMENT TABLE ENTRY |

DATA COMPARE MANAGEMENT TABLE ENTRY ~224

| ITEM |
|---|
| HISTORY TABLE ADDRESS |
| ZONE WRITE COUNT = 0 |
| WRITE POINTER COUNT = 0 |
| HISTORY TABLE LATEST OFFSET = 0 |
| CUMULATIVE APPEND SEQUENCE NUMBER = 0x00000 → 0x00010 → 0x00020 |
| LBA WRITE COUNT INFORMATION TABLE ADDRESS |
| ALTERNATIVE EXPECTED VALUE TABLE ADDRESS |

LBA WRITE COUNT INFORMATION TABLE ~2244

| OFFSET | ITEM |
|---|---|
| 0x00 | — |
| 0x01 | — |
| ... | ... |
| 0x0F | — |
| 0x10 | — |
| 0x11 | — |
| ... | ... |
| ZCAP-1 | — |

ALTERNATIVE EXPECTED VALUE TABLE ~2245

| OFFSET | ITEM |
|---|---|
| 0x00 | — |
| 0x01 | — |
| ... | ... |
| 0x0F | — |
| 0x10 | — |
| 0x11 | — |
| ... | ... |
| ZCAP-1 | — |

TEMPORARY EXPECTED VALUE TABLE ~2242

| SQID | CID | ITEM |
|---|---|---|
| 1 | 0 | ZONE NUMBER = 0x02, ASN = 0x00000 |
| 1 | 1 | ZONE NUMBER = 0x02, ASN = 0x00010 |
| 1 | ... | ... |
| 1 | L-1 | — |
| 2 | 0 | — |
| 2 | 1 | — |
| 2 | ... | ... |
| 2 | L-1 | — |
| ... | ... | ... |
| M-1 | 0 | — |
| M-1 | 1 | — |
| M-1 | ... | ... |
| M-1 | L-1 | — |

INFORMATION PROCESSING DEVICE AND TEST METHOD FOR EVALUATING DATA INTEGRITY

CROSS-REFERENCE TO RELATED APPLICATION

This application is based upon and claims the benefit of priority from Japanese Patent Application No. 2022-120470, filed Jul. 28, 2022, the entire contents of which are incorporated herein by reference.

FIELD

Embodiments described herein relate generally to an information processing device and a test method.

BACKGROUND

In recent years, memory systems that control nonvolatile memories have become widespread. As such a memory system, a solid state drive (SSD) having a NAND flash memory is known.

To test a memory system such as an SSD, a test related to evaluation of data integrity of data written in the memory system may be performed. An evaluation of data integrity test is a test to determine whether the same data as data written in the memory system can be correctly read from the memory system.

More recently, memory systems configured to manage a plurality of zones have also been developed.

Therefore, memory system testing requires a technique that can efficiently evaluate the data integrity of data written in a zone.

DESCRIPTION OF THE DRAWINGS

FIG. 4 is a block diagram showing a configuration example of zones according to the embodiment of the present disclosure.

FIG. 12 is a diagram showing an example of values set in a data compare management table entry and a temporary expected value table when a zone append command is issued in the information processing device according to the embodiment of the present disclosure.

DETAILED DESCRIPTION

Embodiments provide an information processing device and a test method capable of efficiently evaluating data integrity of data written in a zone.

In general, according to one embodiment, there is provided an information processing device including a processor configured to execute a test operation related to evaluation of data integrity of data written in a memory system; and a memory. The processor stores, in the memory, first write data to be written to a storage area of the memory system. The processor embeds a zone identifier for uniquely identifying a zone including a plurality of consecutive logical addresses, and a sequence number for each logical address in a head or an end of a sector of the first write data stored in the memory. The processor issues, to the memory system, a zone append command for designating a head logical address of the zone and a size of the first write data, instead of designating a logical address corresponding to a storage location of the storage area to which the first write data is written, and requesting writing of the first write data to the storage area corresponding to the zone. The processor acquires, after a completion response corresponding to the zone append command is received, a first logical address corresponding to the storage location to which the first write data is written. The processor stores the zone identifier and the sequence number in a first expected value table storing expected values of read data corresponding to the zone for each logical address as first expected values to be used to evaluate data integrity of read data that is read from the storage location corresponding to the first logical address.

Hereinafter, embodiments of the present disclosure will be described with reference to the drawings.

Figure 1:
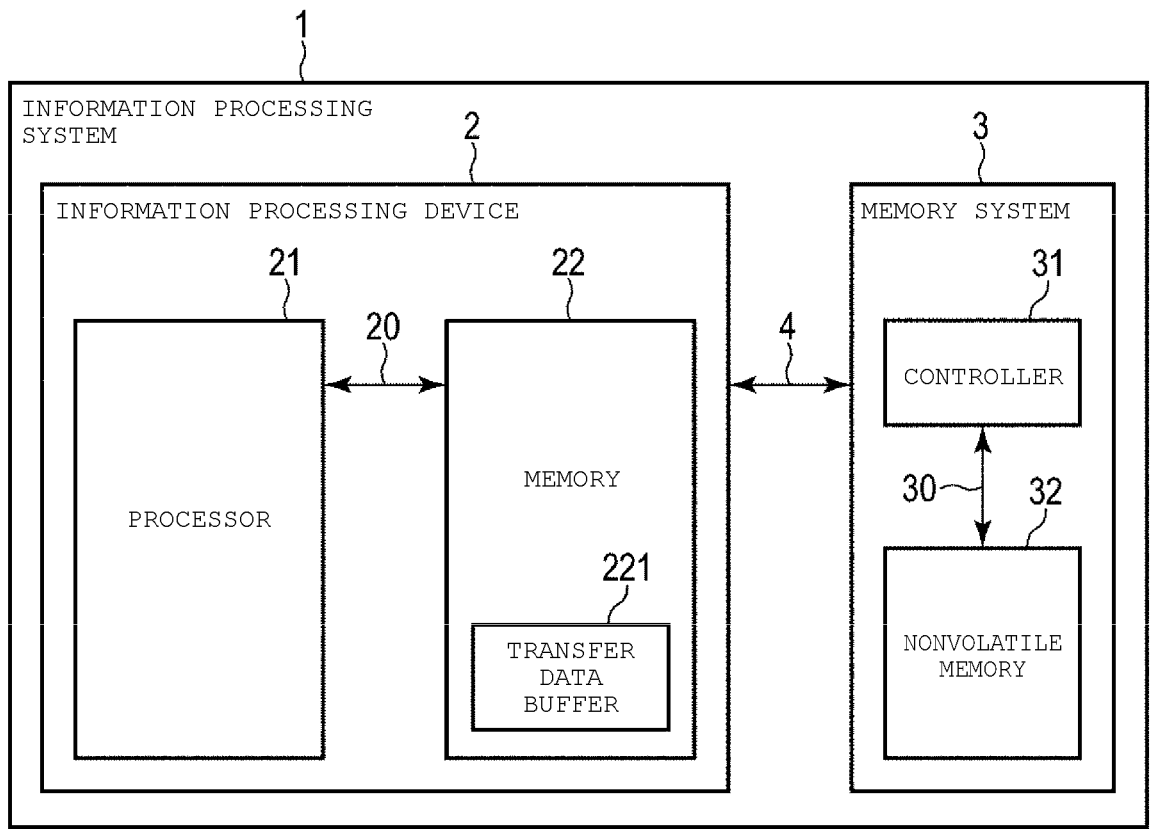
FIG. 1 is a block diagram showing a configuration example of an information processing system including an information processing device according to an embodiment of the present disclosure.

A configuration of an information processing system according to an embodiment of the present disclosure will be described. FIG. 1 is a block diagram showing a configuration example of an information processing system including an information processing device according to an embodiment of the present disclosure. An information processing system 1 includes an information processing device 2 and a memory system 3.

The information processing device 2 is a host system. The information processing device 2 is, for example, a personal computer. The information processing device 2 accesses the memory system 3. Specifically, the information processing device 2 transmits a write command, which is a command for writing data, to the memory system 3. The information processing device 2 also transmits a read command, which is a command for reading data, to the memory system 3.

The memory system 3 is a storage device. The memory system 3 is, for example, an SSD including a NAND flash memory.

The information processing device 2 and the memory system 3 can be connected via a bus 4. The bus 4 is, for example, a PCI Express™ bus (PCIe™ bus). The bus 4 is mainly used for transmitting commands (for example, I/O commands or management commands) from the information processing device 2 to the memory system 3 and for transmitting responses from the memory system 3 to the information processing device 2. An I/O command is a command for writing data to or reading data from a non-volatile memory. A management command is a command for requesting execution of a process related to management or setting of the memory system 3.

Communication between the information processing device 2 and the memory system 3 via the bus 4 is performed, for example, in compliance with the NVM Express™ (NVMe™) standard. In communication between the information processing device 2 and the memory system 3 via the bus 4, one storage area of the memory system 3 corresponds to one zone. A zone is a set including a plurality of consecutive logical addresses. A logical address is an address that logically designates a storage location that is an access target in a storage area of the memory system 3. The logical address is used by the information processing device 2 to write data to or read data from the memory system 3. A logical block address (LBA) is used as the logical address. The zone is, for example, a zoned namespace (ZNS) defined in the NVMe standard.

Next, an internal configuration of the information processing device 2 will be described. The information processing device 2 includes a processor 21 and a memory 22. The processor 21 and the memory 22 are connected to a bus 20.

The processor 21 is a central processing unit (CPU). The processor 21 communicates with the memory system 3 via the bus 4. The processor 21 is communicatively connected to the memory 22 via the bus 20. The processor 21 executes software (specifically, host software) loaded into the memory 22. The host software is loaded into the memory 22 from, for example, the memory system 3. The host software includes an operating system, a file system, a device driver, an application program, and the like.

The memory 22 is a volatile memory. The memory 22 is, for example, a random access memory such as a dynamic random access memory (DRAM). A transfer data buffer 221 is allocated to a part of the storage area of the memory 22. The transfer data buffer 221 is a storage area that temporarily stores write data to be transferred to the memory system 3. The transfer data buffer 221 is also used as a storage area that temporarily stores read data transferred from the memory system 3.

Next, an internal configuration of the memory system 3 will be described. The memory system 3 includes a controller 31 and a nonvolatile memory 32. The controller 31 and the nonvolatile memory 32 are connected to a bus 30.

The controller 31 is a memory controller. The controller 31 is a control circuit such as a system-on-a-chip (SoC). The controller 31 is communicatively connected to the nonvolatile memory 32 via the bus 30. The controller 31 writes data to the nonvolatile memory 32. The controller 31 reads data from the nonvolatile memory 32. The controller 31 also communicates with the outside via a bus 4.

The nonvolatile memory 32 is a nonvolatile memory. The nonvolatile memory 32 is, for example, a NAND flash memory. The nonvolatile memory 32 is, for example, a two-dimensional structure flash memory or a three-dimensional structure flash memory. The nonvolatile memory 32 includes a plurality of blocks. Each of the plurality of blocks is the unit of a data erase operation. The data erase operation is an operation of erasing data. Each of the plurality of blocks will also be referred to as a physical block, an erase block, a flash block, or a memory block. Each of the plurality of blocks includes a plurality of pages. Each of the plurality of pages is the unit of a data write operation and a data read operation. The data write operation is an operation of writing data to the nonvolatile memory 32. The data read operation is an operation of reading data from the nonvolatile memory 32. Each of the plurality of pages includes a plurality of memory cells connected to the same word line. One block or a plurality of blocks of the nonvolatile memory 32 are assigned to one zone managed by the controller 31 as a physical storage area of the one zone.

Figure 2:
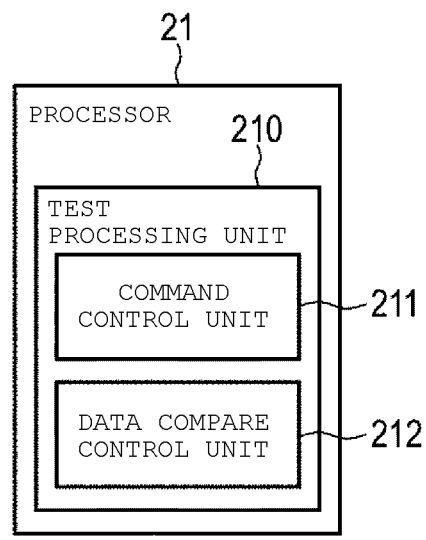
FIG. 2 is a block diagram showing an example of a functional configuration of a processor according to the embodiment of the present disclosure.

Next, a functional configuration of the processor 21 of the information processing device 2 will be described. FIG. 2 is a block diagram showing an example of a functional configuration of the processor of the information processing device according to the embodiment of the present disclosure.

The processor 21 includes a test processing unit 210. A part or the whole of the test processing unit 210 may be implemented by another hardware of the information processing device 2.

The test processing unit 210 performs a test operation related to evaluation of data integrity of data written in the memory system 3. The test operation related to evaluation of data integrity is an operation of determining whether data written in the memory system 3 can be correctly read from the memory system 3. The test operation related to evaluation of data integrity is, for example, an operation of determining whether data written in a storage location corresponding to a logical address in a test target zone can be correctly read. The test processing unit 210 performs a test operation related to evaluation of data integrity on data written in each of the plurality of storage areas of the memory system 3 respectively corresponding to the plurality of zones.

The test processing unit 210 includes a command control unit 211 and a data compare control unit 212. One or both of the command control unit 211 and the data compare control unit 212 may be implemented by separate hardware of the information processing device 2.

The command control unit 211 generates various commands to be issued to the memory system 3. The various commands include I/O commands and management commands.

The I/O commands include, for example, a write command, a read command, a zone append command, and a copy command.

The write command is a command for designating a logical address and a size of write data, and requesting that write data to be written to a storage location corresponding to the designated logical address. The logical address designated by the write command will also be referred to as a start logical address (in other words, a start LBA) or a write destination logical address. Specifically, the write command designates a start logical address (in other words, a start LBA), a size of write data (in other words, a transfer block size), and an address indicating a storage location in the transfer data buffer 221 in which the write data is stored. A high-order bit portion of the start LBA indicates a head logical address of one of the plurality of zones. The head logical address of each of the plurality of zones will be referred to as a zone start LBA (ZSLBA). The zone of which the ZSLBA is designated by the high-order bit portion of the start LBA will also be referred to as a write destination zone. A low-order bit portion of the start LBA indicates an offset from the ZSLBA of the write destination zone to a first sector of a write destination (in other words, a first logical block of a write destination). A sector (in other words, a logical block) is the unit of data having a size corresponding to one logical address. The size corresponding to one logical address, that is, a sector size is, for example, 512 bytes or 4096 bytes. For example, offset of 0x00 indicates a head sector of the zone. A size of write data (in other words, a transfer block size) is represented by the number of sectors to be written (that is, the number of LBAs). The write data is written to a storage location in the storage area of the memory system 3 corresponding to the write destination zone. One block or a set of several blocks in the nonvolatile memory 32 is used as one storage area corresponding to one zone. One storage area includes a plurality of storage locations equal in number to the number of logical addresses included in one zone. The write data is written to a storage location corresponding to the offset indicated by the start LBA among the plurality of storage locations included in the storage area corresponding to the write destination zone. The write data written to the storage location corresponding to the start LBA designated by the write command will also be referred to as second write data.

The read command is a command for designating a logical address and requesting reading of data from a storage location corresponding to the logical address. The logical address designated by the read command will also be referred to as a start logical address (in other words, a start LBA). Specifically, the read command designates a logical address, a size of read target data, and an address indicating a storage location in the transfer data buffer 221 to which read data is transferred. A high-order bit portion of the logical address designated by the read command indicates a head logical address of one zone. The zone of which the ZSLBA is designated by the high-order bit portion of the start LBA of the read command will also be referred to as a read target zone. A low-order bit portion of the start LBA indicates an offset from the ZSLBA of the read target zone to a first sector of a read target (in other words, a first logical block of a read target). Data is read from a storage location corresponding to an offset indicated by the start LBA among the plurality of storage locations included in the storage area corresponding to the read target zone.

The zone append command is a command for designating a head logical address of a zone and a size of write data, instead of designating a logical address (in other words, a start LBA) corresponding to a storage location to which the write data is written among a plurality of storage locations included in a storage area corresponding to the zone, and requesting writing of the write data to a storage area corresponding to the zone. In other words, the zone append command is a command for designating a ZSLBA, which is a head logical address of the zone, instead of designating a start LBA. Specifically, the zone append command designates a head logical address of the zone, a size of the write data, and an address indicating a storage location in the transfer data buffer 221 into which the write data is stored. In an operation of writing write data based on a zone append command, a logical address (in other words, a start LBA) corresponding to a storage location to which the write data is written is determined by the controller 31 such that writing of data in a zone having a ZSLBA designated by the zone append command is sequentially performed. In other words, a logical address corresponding to a storage location to which the write data is written is determined such that writing of data in a storage area corresponding to a zone having a ZSLBA is performed sequentially in the order of logical addresses. A logical address corresponding to a storage location to which write data is written among a plurality of storage locations included in a storage area corresponding to a zone is reported from the memory system 3 to the information processing device 2 by using a completion response to the zone append command. The completion response is a response indicating completion of processing of the zone append command. In the following description, write data associated with the zone append command will also be referred to as first write data. A logical address corresponding to a storage location to which the write data associated with the zone append command is written will also be referred to as a first logical address.

The copy command is a command for requesting that data written in a storage location corresponding to a copy source logical address is copied to a storage location corresponding to a copy destination logical address. The copy command designates the copy source logical address, a copy destination logical address, and a size of copy target data. Copying of data from the storage location corresponding to the copy source logical address to the storage location corresponding to the copy destination logical address is executed in the memory system 3. Thus, in the data copy operation, data transfer from the memory system 3 to the information processing device 2 and data transfer from the information processing device 2 to the memory system 3 are not executed. Data is read from the storage location corresponding to the copy source logical address among a plurality of storage locations included in a storage area corresponding to a copy source zone including the copy source logical address. The read data is written to the storage location corresponding to the copy destination logical address among a plurality of storage locations included in a storage area corresponding to the copy destination zone including the copy destination logical address. In the following description, a copy command for designating a logical address corresponding to data written on the basis of the zone append command as a logical address of a copy source will also be referred to as a first copy command. A copy command for designating a logical address corresponding to data written on the basis of a write command as the logical address of the copy source will also be referred to as a second copy command.

The management commands include a first zone management command, a second zone management command, and the like.

The first zone management command is a command to reset the zone to a free state. The free state is a state in which writing can be started from a head logical address of a zone (ZSLBA).

The second zone management command is a command for finishing the zone. Finishing the zone means completing a write operation for the zone, that is, a write operation for a storage area corresponding to the zone.

The command control unit 211 writes data to the storage area of the memory system 3 by using the write command or the zone append command. When data is written to the storage area of the memory system 3 by using the write command, the command control unit 211 generates the write command and stores the generated write command in a submission queue that will be described later. The command control unit 211 also stores write data to be written to the storage area of the memory system 3, that is, write data associated with the write command, in the transfer data buffer 221 of the memory 22. The command control unit 211 then notifies the data compare control unit 212 that the write data associated with the write command has been stored in the transfer data buffer 221 of the memory 22. When data is written to the storage area of the memory system 3 by using the zone append command, the command control unit 211 generates the zone append command and stores the generated zone append command in the submission queue that will be described later. The command control unit 211 also stores write data to be written to the storage area of the memory system 3, that is, write data associated with the zone append command, in the transfer data buffer 221 of the memory 22. The command control unit 211 then notifies the data compare control unit 212 that the write data associated with the zone append command has been stored in the transfer data buffer 221 of the memory 22.

The data compare control unit 212 executes a write data generation operation and a data compare operation. The write data generation operation is an operation of embedding identification information in a head or an end of each sector included in the write data stored in the transfer data buffer 221 of the memory 22. The identification information is information used to evaluate data integrity of data written to the memory system 3.

The data compare operation is an operation of comparing identification information included in a head or an end of each sector included in data read from the memory system 3 with an expected value. The data compare control unit 212 evaluates the data integrity of the read data on the basis of a comparison result. When the identification information and the expected value match, the data compare control unit 212 evaluates that writing the data to a storage location in the memory system 3 corresponding to a logical address and reading the data from the storage location in the memory system 3 corresponding to the logical address have been executed normally. When the identification information and the expected value do not match, the data compare control unit 212 evaluates that writing the data to a storage location in the memory system 3 corresponding to a logical address and reading the data from the storage location in the memory system 3 corresponding to the logical address have not been executed successfully.

Next, identification information embedded in a sector of write data will be described. First, identification information embedded in a sector of write data associated with a write command will be described. When the command control unit 211 notifies that the write data associated with the write command has been stored in the transfer data buffer 221 of the memory 22, the data compare control unit 212 embeds a logical address (also referred to as an SLBA) designated by the write command and a write count corresponding to the logical address in a head or an end of a sector of the write data stored in the transfer data buffer 221 as identification information. The write count is information indicating the number of times a command for writing data has been issued for each logical address. Next, identification information embedded in a sector of write data associated with the zone append command will be described. When write data is written to a storage area corresponding to a zone by using the zone append command, the data compare control unit 212 cannot pre-embed a logical address in a sector of the write data. This is because a logical address corresponding to a storage location to which the write data is written is not fixed until processing of the zone append command is completed. Therefore, when the command control unit 211 notifies that the write data associated with the zone append command has been stored in the transfer data buffer 221 of the memory 22, the data compare control unit 212 embeds a zone identifier and a sequence number as identification information in the head or the end of the sector of the write data stored in the transfer data buffer 221. The zone identifier is an identifier for uniquely identifying a zone. The zone identifier is, for example, a zone number. The zone number is a quotient obtained by dividing a ZSLBA designated by the zone append command by a zone size. In the following description, a case where a zone number is embedded in a sector as a zone identifier will be described as an example. The sequence number is a unique number for each logical address included in the zone. The sequence number is embedded in each sector included in write data. The sequence number embedded in each sector of write data is incremented by 1 each time the number of sectors to be written (that is, the number of LBAs) is increased by one. For example, when an initial sequence number is 10 and the number of sectors (that is, the number of LBAs) to be written by the zone append command is three sectors (that is, three LBAs), the sequence number "10" is embedded in a first sector of the write data, the sequence number "11" is embedded in a second sector of the write data, and the sequence number "12" is embedded in a third sector of the write data. The sequence number "13" is embedded in a first sector of write data associated with the next zone append command for designating a ZSLBA of the same zone. Therefore, a sequence number embedded in each sector of write data written to a storage area corresponding to a zone is a unique number for each LBA included in the zone. In the following description, a sequence number will be referred to as an append sequence number.

Figure 3:
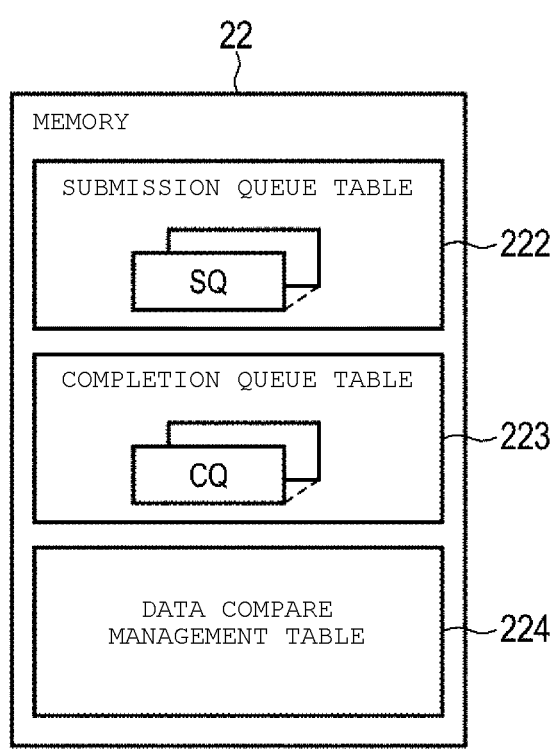
FIG. 3 is a block diagram showing examples of various tables stored in a memory of the information processing device according to the embodiment of the present disclosure.

Next, tables stored in the memory 22 will be described. FIG. 3 is a block diagram showing examples of various tables stored in the memory of the information processing device according to the embodiment of the present disclosure.

The memory 22 stores a submission queue table 222, a completion queue table 223 and a data compare management table 224.

The submission queue table 222 is a table including a plurality of submission queues (SQ). An SQ is a queue used to issue a command. The SQ includes a plurality of slots. Each of the plurality of slots is a storage area that stores one command.

The completion queue table 223 is a table including a plurality of completion queues (CQ). A CQ is a queue used to receive a completion response corresponding to a command. The CQ includes a plurality of slots. Each of the plurality of slots is a storage area that stores a completion response. The completion response is a response indicating completion of command processing. The completion response includes, for example, an identifier of an SQ (also referred to as an SQID) from which a completed command has been fetched, an identifier of the completed command (also referred to as a CID), and a status of the completed command. A completion response to a zone append command includes not only an SQID, a CID, and a status, but also a logical address corresponding to a storage location to which write data associated with the zone append command is written. The logical address corresponding to the storage location to which the write data is written is a logical address (also referred to as an SLBA) corresponding to a first storage location to which the write data is written among a plurality of logical addresses respectively corresponding to a plurality of storage locations included in a storage area corresponding to a zone. A logical address corresponding to a storage location to which write data is written will also be referred to as a first logical address.

The data compare management table 224 is a table that stores information necessary for a data compare operation. The data compare management table 224 stores information necessary for the data compare operation, for example, for each zone.

Next, a zone will be described. FIG. 4 is a diagram showing a configuration example of a zone according to the embodiment of the present disclosure.

FIG. 4 shows a case where a logical address space used by the information processing device 2 to access the memory system 3 is configured with consecutive z logical addresses from LBA 0 to LBA z−1. The logical address space is partitioned into a plurality of zones. A zone is a set including a plurality of consecutive logical addresses. The logical address space is partitioned into x zones from a zone #0 to a zone #x−1, for example.

The zone #0 is a head zone of the logical address space. The zone #0 includes consecutive logical addresses from LBA 0 to LBA m−1. A head logical address of the zone #0, that is, a start logical address (ZSLBA) of the zone #0 is LBA 0. A size of the zone #0 (that is, the number of LBAs) is m.

The zone #1 is a zone that follows the zone #0. The zone #1 includes consecutive logical addresses from LBA m to LBA n−1. A ZSLBA of the zone #1 is LBA m. A size of the zone #1 is n-m.

The zone #x−1 is an end zone of the logical address space. The zone #x−1 includes consecutive logical addresses from LBAy to LBAz−1. A ZSLBA of the zone #x−1 is LBA y. A size of the zone #x−1 is z-y.

The x zones from the zone #0 to the zone #x−1 have the same size. Therefore, n, y, and z in FIG. 4 are each integer multiples of m.

Figure 5:
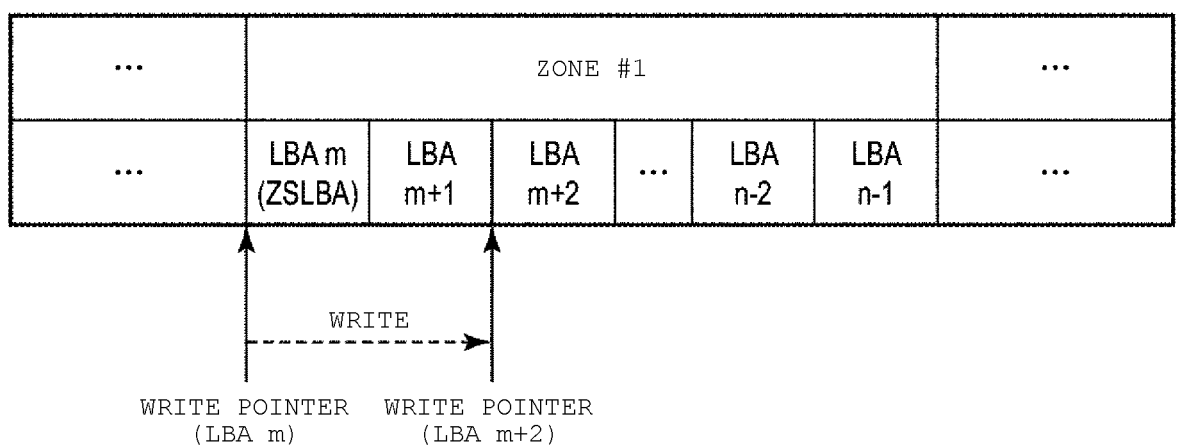
FIG. 5 is a block diagram showing write pointers managed by the information processing device according to the embodiment of the present disclosure.

Next, a write pointer will be described. FIG. 5 is a block diagram showing write pointers managed by the information processing device according to the embodiment of the present disclosure.

A write pointer is managed for each zone. In FIG. 5, a write pointer corresponding to zone #1 is shown. The write pointer corresponding to the zone #1 indicates a next writable LBA of the zone #1. A value of the write pointer is incremented by the number of LBAs (that is, sectors) to which data is written each time the data is sequentially written to the zone #1.

When the zone #1 is in a free state, the write pointer corresponding to the zone #1 indicates LBA m, which is a ZSLBA of the zone #1. When data is written to two storage locations indicated by LBA m and LBA m+1, a value of the write pointer is updated to LBA m+2. LBA m+2 indicates the smallest LBA among the unwritten LBAs in the zone #1, that is, the next writable LBA in the zone #1.

The write pointer is managed in each of the memory system 3 and the information processing device 2. In the following description, a write pointer managed by the information processing device 2 will be referred to as a host write pointer.

Next, an outline of a process for writing data to a zone will be described. The processor 21 stores a write command or a zone append command in a slot of the submission queue (SQ). The processor 21 stores write data to be written to the storage area of the memory system 3 in the transfer data buffer 221 of the memory 22 on the basis of the write command or the zone append command. The processor 21 embeds identification information in a head or an end of a sector of the write data stored in the transfer data buffer 221. The processor 21 issues the write command or the zone append command to the memory system 3 by notifying the memory system 3 that a new command (the write command or the zone append command) has been stored in the submission queue.

When notified that a new command has been stored in the submission queue, the controller 31 of the memory system 3 performs read access on the submission queue and fetches the new command (that is, the write command or the zone append command) from the submission queue. The controller 31 acquires write data from the transfer data buffer 221 by performing read access on the transfer data buffer 221. When the fetched command is the write command, the controller 31 writes the acquired write data to a storage location corresponding to a storage location defined by an offset designated by low-order bits of a designated SLBA among a plurality of storage locations included in a storage area corresponding to a zone having a ZSLBA indicated by a high-order bit portion of the SLBA designated by the write command. When the fetched command is the zone append command, the controller 31 determines a logical address corresponding to a storage location to which the write data is written such that writing of data in a zone having a ZSLBA designated by the zone append command is performed sequentially. The controller 31 then writes the acquired write data to the storage location corresponding to the determined logical address.

When the processing of the write command or the zone append command is completed, the controller 31 performs write access on the completion queue and stores a completion response corresponding to the completed command in the completion queue.

Next, an outline of a process of reading data will be described. The processor 21 stores the read command in a slot of the submission queue (SQ). The processor 21 issues the read command to the memory system 3 by notifying the memory system 3 that a new command (that is, the read command) has been stored in the submission queue.

When notified that a new command has been stored in the submission queue, the controller 31 of the memory system 3 performs read access on the submission queue and fetches the new command (that is, the read command) from the submission queue. The controller 31 reads data from a storage location corresponding to a read target LBA (in other words, a start LBA) on the basis of the read target LBA designated by the read command. When processing of the read command is completed, the controller 31 performs write access on the transfer data buffer 221 and stores read data in the transfer data buffer 221. The controller 31 performs write access on the completion queue and stores a completion response corresponding to the completed read command in the completion queue.

Figure 6:
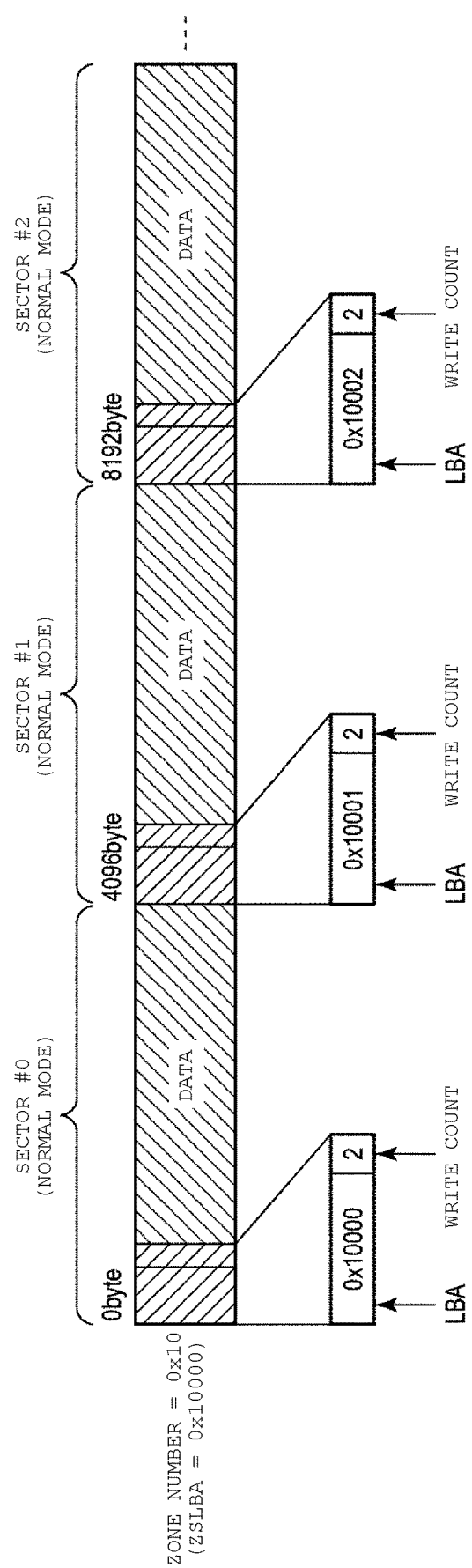
FIG. 6 is a block diagram showing a configuration example of write data created by the information processing device according to the embodiment of the present disclosure.

Next, write data created when the information processing device 2 issues a write command to the memory system 3 will be described. FIG. 6 is a block diagram showing a first configuration example of write data created in the information processing device according to the embodiment of the present disclosure.

FIG. 6 shows a configuration of write data created when a write command for designating one of a plurality of logical addresses included in a zone having a zone number "0x10" as an SLBA is issued. It is assumed here that an SLBA indicates a ZSLBA of the zone having the zone number "0x10". The ZSLBA of the zone having the zone number "0x10" is, for example, 0x10000. Here, "0x" represents hexadecimal notation. The write data shown in FIG. 6 is second write data written to a storage area of the memory system 3 corresponding to a zone on the basis of the write command. The write data is created in the transfer data buffer 221 of the memory 22.

An LBA and a write count are embedded in each sector included in the write data associated with this write command. For example, when a size of the write data is three sectors and a size of the sector is 4096 bytes, an LBA and a write count are embedded in each of the 0th byte, the 4096th byte, and the 8192nd byte in the write data.

Since the start LBA designated by this write command is 0x10000, the sector #0 of the write data is data written to a storage location corresponding to the head LBA (specifically, 0x10000) of the zone having the zone number "0x10". Therefore, the LBA value embedded in the sector #0 included in the write data is 0x10000. The write count embedded in the sector #0 indicates the number of times a command for giving an instruction for writing data to 0x10000 has been issued. When the command for giving an instruction for writing data to 0x10000 has already been issued once before this write command is issued, a write count indicating 2 is embedded in the sector #0.

As described above, when the sector in which the LBA and the write count are embedded is written to the storage location corresponding to 0x10000, 0x10000 is managed as a normal mode LBA.

The sector #1 of the write data is written to a storage location corresponding to the second LBA (specifically, 0x10001) in the zone having the zone number "0x10". Therefore, the LBA value embedded in the sector #1 included in the write data is 0x10001. The write count embedded in the sector #1 indicates the number of times a command for giving an instruction for writing data to 0x10001 has been issued. When the command for giving an instruction for writing data to 0x10001 has already been issued once before this write command is issued, a write count indicating 2 is embedded in the sector #1.

As described above, when the sector in which the LBA and write count are embedded is written to the storage location corresponding to 0x10001, 0x10001 is managed as a normal mode LBA.

The sector #2 of the write data is written in a storage location corresponding to the third LBA (specifically, 0x10002) in the zone having the zone number "0x10". Therefore, the LBA value embedded in the sector #2 included in the write data is 0x10002. The write count embedded in the sector #2 indicates the number of times a command for giving an instruction for writing data to 0x10002 has been issued. When the command for giving an instruction for writing data to 0x10002 has already been issued once before this write command is issued, a write count indicating 2 is embedded in the sector #2.

As described above, when the sector in which the LBA and write count are embedded is written to the storage location corresponding to 0x10002, 0x10002 is managed as a normal mode LBA.

Figure 7:
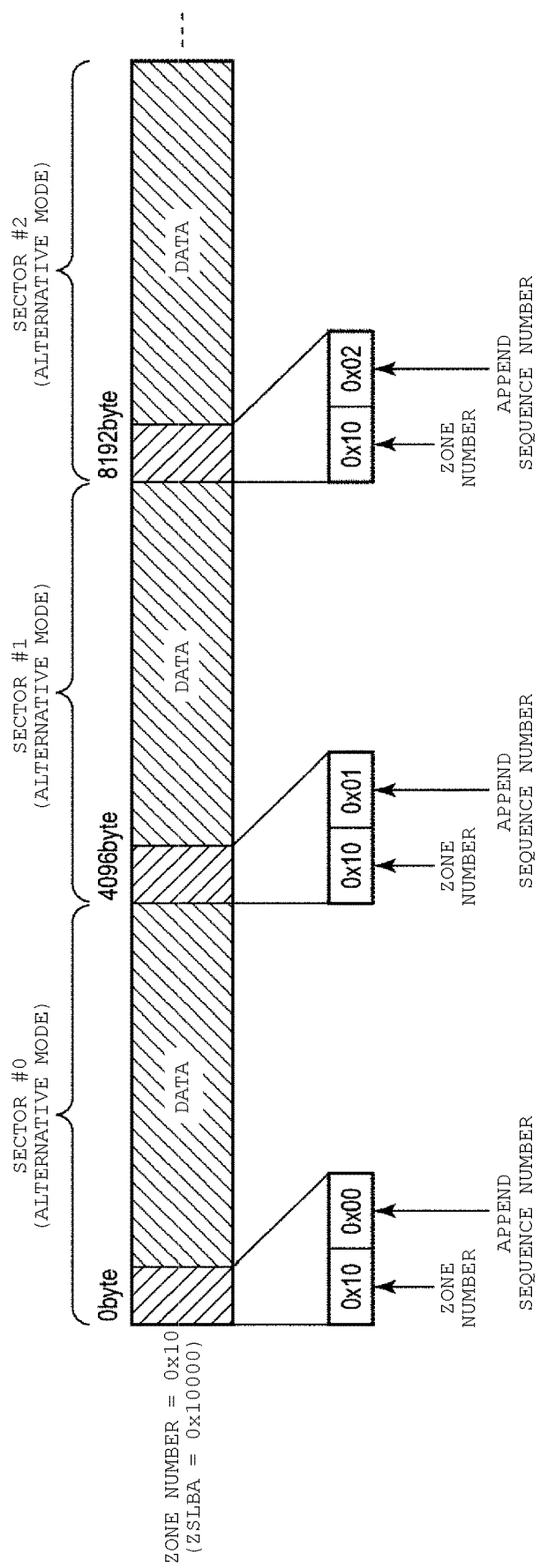
FIG. 7 is a block diagram showing another configuration example of write data created by the information processing device according to the embodiment of the present disclosure.

Next, write data created when the information processing device 2 issues a zone append command to the memory system 3 will be described. FIG. 7 is a diagram showing a second configuration example of write data created by the information processing device according to the embodiment of the present disclosure.

FIG. 7 shows a configuration of write data created when a zone append command for designating 0x10000 as a head LBA of a write destination zone is issued. The write data shown in FIG. 7 is first write data written to a storage area of the memory system 3 corresponding to a zone on the basis of the zone append command.

A zone number and an append sequence number are embedded instead of an LBA in each sector included in the write data associated with this zone append command.

A zone number is a number that can uniquely identify a zone to which write data is to be written. An LBA designated by the zone append command indicates 0x10000. Therefore, the zone to which the write data is to be written is a zone having a ZSLBA (specifically, 0x10000), that is, a zone having the zone number "0x10". The zone number is given by a quotient obtained by dividing an LBA designated by the command by a zone size.

The append sequence number is a sequence number that is a unique value for each LBA of the zone having the zone number "0x10". The append sequence number is a value different from a value of each of LBAs included in the zone having the zone number "0x10". A size of the identification information embedded in the write data as the append sequence number is, for example, smaller than the size of the LBA. The append sequence number is generated, for example, on the basis of a cumulative append sequence number corresponding to the zone having the zone number "0x10". The cumulative append sequence number is a cumulative value obtained by accumulating a size of the data designated by the zone append commands each time the zone append command designating a ZSLBA of the zone having the zone number "0x10" is issued.

When data has not yet been written to the storage area corresponding to the zone having the zone number "0x10", the sector #0 of the write data is written to a storage location corresponding to the head LBA (specifically, 0x10000) of the zone having the zone number "0x10". The zone number embedded in the sector #0 of the write data is 0x10. Since data has not yet been written to the storage area corresponding to the zone having the zone number "0x10", the cumulative append sequence number is 0x00. Thus, the append sequence number embedded in the sector #0 is 0x00.

As described above, when the sector in which the zone number and the append sequence number are embedded is written to the storage location corresponding to 0x10000, 0x10000 is managed as an alternative mode LBA.

The sector #1 of the write data is written to a storage location corresponding to the second LBA (specifically, 0x10001) of the zone having the zone number "0x10". The zone number embedded in the sector #1 included in the write data is 0x10. The append sequence number embedded in the sector #1 is 0x01, which is a value obtained by incrementing the append sequence number "0x00" embedded in the sector #0 by 1.

As described above, when the sector in which the zone number and the append sequence number are embedded is written to the storage location corresponding to 0x10001, 0x10001 is managed as an alternative mode LBA.

The sector #2 of the write data is written to a storage location corresponding to the third LBA (specifically, 0x10002) of the zone having the zone number "0x10". The zone number embedded in the sector #2 included in the write data is 0x10. The append sequence number embedded in the sector #2 is 0x02, which is a value obtained by incrementing the append sequence number "0x00" embedded in the sector #0 by 2.

As described above, when the sector in which the zone number and the append sequence number are embedded is written to the storage location corresponding to 0x10002, 0x10002 is managed as an alternative mode LBA.

Figure 8:
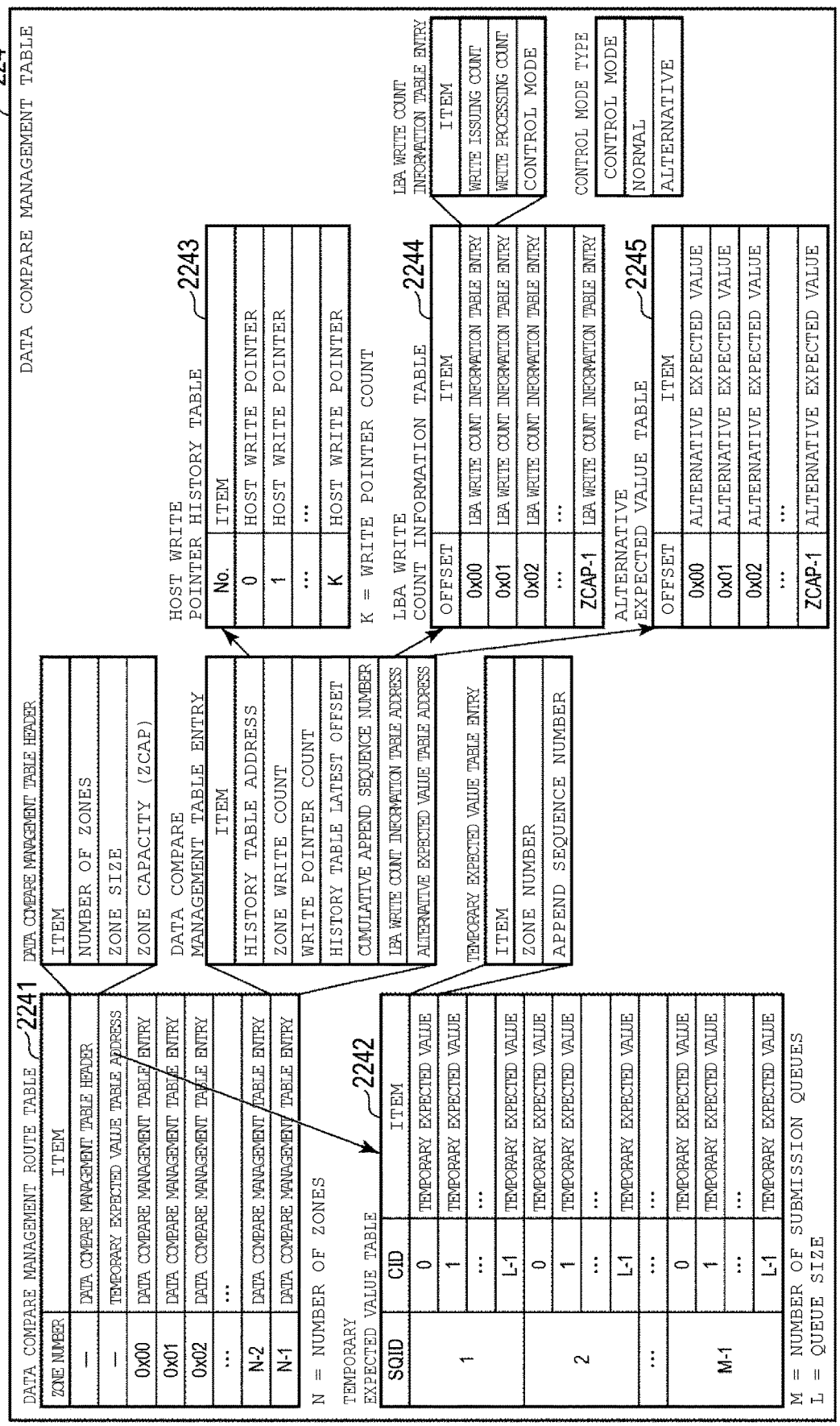
FIG. 8 is a diagram showing a configuration example of a data compare management table according to the embodiment of the present disclosure.

Next, a configuration example of the data compare management table 224 will be described. FIG. 8 is a diagram showing a configuration example of a data compare management table according to the embodiment of the present disclosure.

A data compare management table 224 includes a data compare management route table 2241, a temporary expected value table 2242, a write pointer history table 2243, a write count information table 2244, and an expected value table 2245. In the following description, the write pointer history table 2243, the write count information table 2244, and the expected value table 2245 will be respectively referred to as a host write pointer history table 2243, an LBA write count information table 2244, and an alternative expected value table 2245.

The data compare management route table 2241 is a main table of a table group forming the data compare management table 224. The data compare management route table 2241 stores a data compare management table header, a temporary expected value table address, and a plurality of data compare management table entries.

The data compare management table header stores information regarding the zone. The information regarding the zone is, for example, the number of zones, a zone size, and a zone capacity (ZCAP). The number of zones is the number of zones managed in the memory system 3 (N here). The zone size is the number of sectors (in other words, an LBA) per zone. The zone capacity is a capacity that data can be written to a storage area corresponding to the zone. The zone capacity has a value equal to or less than the zone size. FIG. 8 shows a case where zone capacities of zones managed in the memory system 3 are uniform, but the data compare management route table 2241 stores a zone capacity per zone when a zone capacity is different for each zone.

The temporary expected value table address is an address indicating a storage area in the memory 22 in which the temporary expected value table 2242 is stored. The temporary expected value table address is a base address of the temporary expected value table 2242, for example. The base address of the temporary expected value table 2242 is an address indicating the head of the storage area in the memory 22 in which the temporary expected value table 2242 is stored.

Each of a plurality of data compare management table entries is information required to manage one zone. Each of the plurality of data compare management table entries is associated with a zone number of one zone. For example, a data compare management table entry associated with a zone number "0x00" is information corresponding to a zone having the zone number "0x00". For example, a data compare management table entry associated with a zone number "N−1" is information corresponding to a zone having the zone number "N−1". One data compare management table entry includes a history table address, a zone write count, a write pointer count, a history table latest offset, a cumulative append sequence number, an LBA write count information table address, and an alternative expected value table address, as information necessary to manage a corresponding zone.

The history table address is an address indicating a storage area in the memory 22 in which the host write pointer history table 2243 corresponding to one zone is stored. The history table address is a base address of the host write pointer history table 2243, for example. The base address of the host write pointer history table 2243 is an address indicating the head of the storage area in the memory 22 in which the host write pointer history table 2243 is stored.

The zone write count is a value indicating the number of times of writing for the entire storage area corresponding to one zone. The zone write count is incremented by 1 when a total size of data written to the storage area corresponding to one zone reaches the zone capacity, when one zone is reset, or when one zone is finished. When a zone is reset, a state of the zone, that is, a state of the storage area corresponding to the zone, transitions to a free state. A write pointer corresponding to the zone is then changed to a value indicating a ZSLBA of the zone.

The write pointer count is a value indicating the number of entries of the host write pointer history table 2243 corresponding to one zone. The write pointer count is incremented by 1 when a value of the host write pointer is stored in a new entry of the host write pointer history table 2243 corresponding to one zone. In FIG. 8, the value of the write pointer count is K.

The history table latest offset is a value for designating an entry of the host write pointer history table 2243 corresponding to one zone. The entry designated by the history table latest offset is an entry in which a value of the host write pointer is next stored.

The cumulative append sequence number is a cumulative value obtained by accumulating a size of data designated by each zone append command for designating the same ZSLBA. Each time a zone append command for designating a ZSLBA of one zone is issued, a value of the cumulative append sequence number is incremented by a size of write data associated with the issued zone append command.

The LBA write count information table address is an address indicating a storage area in the memory 22 in which the LBA write count information table 2244 corresponding to one zone is stored. The LBA write count information table address is a base address of the LBA write count information table 2244, for example. The base address of the LBA write count information table 2244 is an address indicating the head of the storage area in the memory 22 in which the LBA write count information table 2244 is stored.

The alternative expected value table address is an address indicating a storage area in the memory 22 in which the alternative expected value table 2245 corresponding to one zone is stored. The alternative expected value table address is, for example, a base address of the alternative expected value table 2245. The base address of the alternative expected value table 2245 is an address indicating the head of the storage area in the memory 22 in which the alternative expected value table 2245 is stored.

Next, the temporary expected value table 2242 will be described. The temporary expected value table 2242 is a table that stores a temporary expected value for each zone append command stored in the SQ. The temporary expected value is a value used to generate an expected value used to evaluate the data integrity of data written to the memory system 3 on the basis of a zone append command. In other words, the temporary expected value is a seed of an expected value. As the temporary expected value, a zone number of a zone having a ZSLBA designated by a zone append command and a cumulative append sequence number corresponding to the zone having the ZSLBA designated by the zone append command are used.

The temporary expected value table 2242 has a plurality of temporary expected value table entries. Each of the plurality of temporary expected value table entries is correlated with a combination of one SQ identifier (SQID) and one command ID (CID). For example, when the number of SQs is M and a size of an SQ is L, the number of temporary expected value table entries of the temporary expected value table 2242 is a product of (M−1) and L. One SQ out of the M SQs is a queue used only for issuing a management command. Therefore, the temporary expected value table 2242 does not have a temporary expected value table entry corresponding to the SQ used only for issuing a management command. A size of the SQ corresponds to the number of slots included in the SQ. M is, for example, an integer of 2 or greater. L is, for example, an integer of 2 or greater.

Next, the host write pointer history table 2243 corresponding to one zone will be described. The host write pointer history table 2243 is a write pointer history table that is a table storing history information of a write pointer (in other words, a host write pointer) corresponding to a zone. The host write pointer history table 2243 stores values of host write pointers corresponding to one zone. The host write pointer history table 2243 includes a plurality of entries. Each entry is a storage area that stores a value of a host write pointer. An entry in which the host write pointer is stored is indicated by a history table latest offset. The history table latest offset is incremented by 1, for example, when a corresponding zone is reset or when the corresponding zone is finished. When a data write operation for the corresponding zone progresses, a value of the host write pointer stored in the entry indicated by the history table latest offset is updated.

Next, the LBA write count information table 2244 corresponding to one zone will be described. The LBA write count information table 2244 is a table that stores write count information indicating the number of times of writing for storage locations respectively corresponding to a plurality of logical addresses included in a zone. The LBA write count information table 2244 will also be referred to as a write count information table. The LBA write count information table 2244 stores information corresponding to each of a plurality of LBAs included in one zone. The LBA write count information table 2244 includes a plurality of LBA write count information table entries. Each of the LBA write count information table entries corresponds to one of the plurality of LBAs included in the zone. In the LBA write count information table 2244, an LBA is represented by an offset from a ZSLBA of the zone to that LBA. The LBA write count information table entry includes a write issuing count, a write processing count, and a control mode. In one LBA write count information table entry, the write issuing count is a value indicating the number of times a command for writing data to a storage location corresponding to the LBA associated with the LBA write count information table entry has been issued. The storage location corresponding to the LBA associated with the LBA write count information table entry will be referred to as a first corresponding storage location. A command for writing data to the first corresponding storage location will be referred to as a first command.

The first command is, for example, a write command. The write issuing count is incremented by 1 each time the first command is issued. The write processing count is a value indicating the number of times data write operations for the first corresponding storage location have been completed. The write processing count is incremented by 1 each time a completion response corresponding to the first command is received. The control mode is a value indicating a mode of an operation of writing data to the first corresponding storage location. When the first command is the write command, the control mode is set to a value indicating a normal mode. When the first command is the zone append command or the copy command, the control mode is set to a value indicating an alternative mode. The LBA write count information table 2244 will also be referred to as a first write count information table.

Next, the alternative expected value table 2245 will be described. The alternative expected value table 2245 is a table that stores an expected value of read data corresponding to a zone for each logical address of the zone. The alternative expected value table 2245 will also be referred to as an expected value table. The read data corresponding to the zone is data read from a storage location in a storage area corresponding to the zone. The expected value of the read data is a value that is expected to be pre-embedded in a sector included in the read data. The expected value of the read data is compared with identification information pre-embedded in the sector included in the read data. The data integrity of the read data is evaluated on the basis of the comparison result. The alternative expected value table 2245 stores the expected value of the read data as an alternative expected value for each LBA included in the corresponding zone. In the alternative expected value table 2245, an LBA is represented by an offset from a ZSLBA of the zone to that LBA. The alternative expected value is set on the basis of the temporary expected values stored in the temporary expected value table 2242 when a data write operation to the storage location corresponding to the associated LBA is performed on the basis of the zone append command. The alternative expected value is set on the basis of information regarding copy source data when data is written to the storage location corresponding to the associated LBA on the basis of the copy command.

Figure 9:
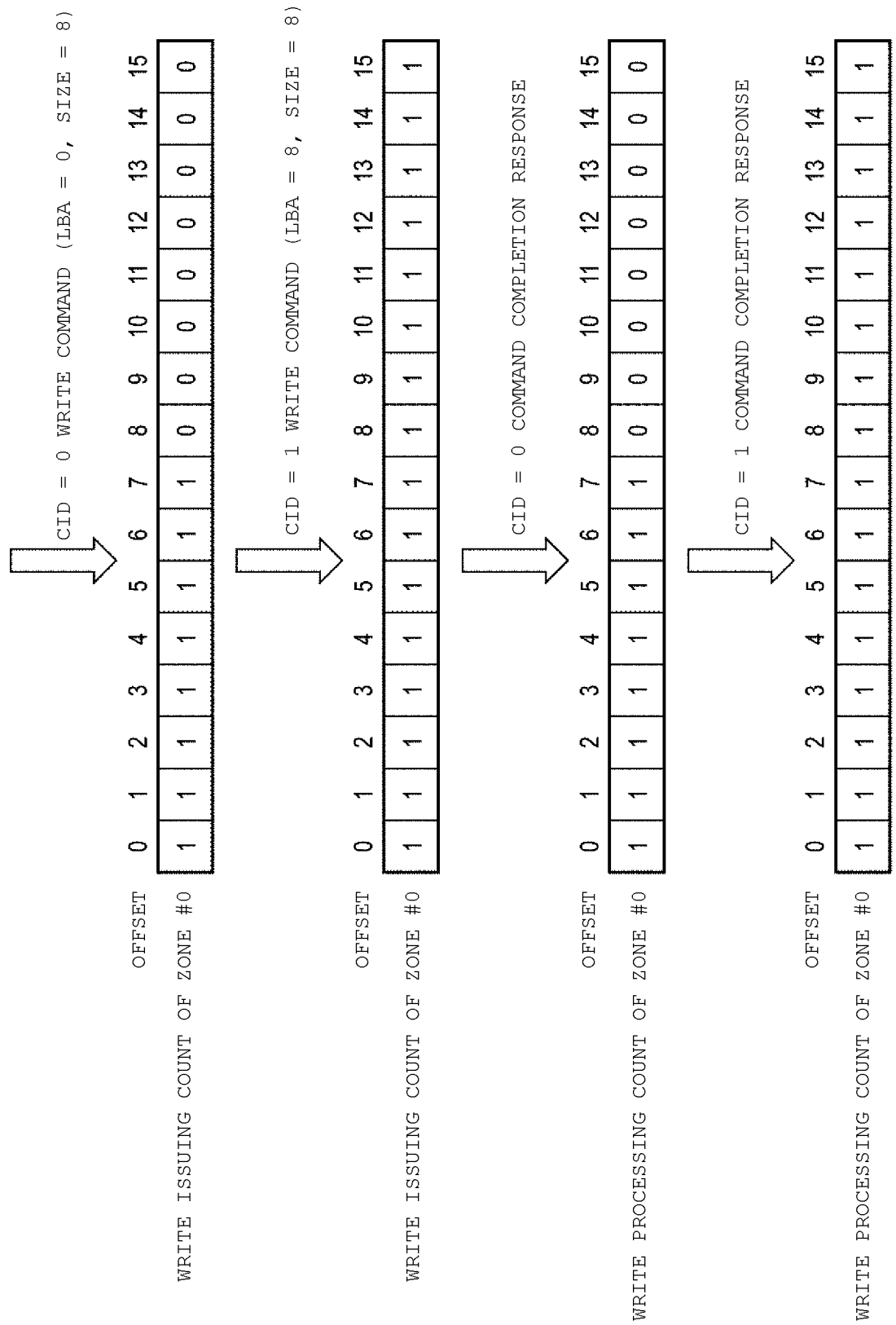
FIG. 9 is a diagram showing an example of updating each of a write issuing count and write processing count stored in an LBA write count information table according to the embodiment of the present disclosure.

Next, incrementing the write issuing count and the write processing count will be described. FIG. 9 is a diagram showing an example of updating each of the write issuing count and the write processing count stored in the LBA write count information table according to the embodiment of the present disclosure.

In FIG. 9, the zone #0 includes 16 LBAs from an offset of 0 to an offset of 15. When no data is written to the zone #0, the write issuing count and the write processing count corresponding to each of all LBAs included in the zone #0 are both 0. In this case, a case where two write commands are issued is assumed.

A command ID (CID) of the first write command is 0. The first write command designates a ZSLBA of the zone #0, the offset of 0, and the size of 8. When the first write command is issued to the memory system 3, a write issuing count corresponding to each of eight LBAs from the offset of 0 to the offset of 7 in the zone #0 is incremented by 1.

A command ID of the second write command is 1. The second write command designates a ZSLBA of the zone #0, the offset of 8, and the size of 8. When the second write command is issued, a write issuing count corresponding to each of eight LBAs from the offset of 8 to the offset of 15 in the zone #0 is incremented by 1.

When a completion response corresponding to the write command having the command ID of 0 is received, a write processing count corresponding to each of the eight LBAs from the offset of 0 to the offset of 7 in the zone #0 is incremented by 1.

When a completion response corresponding to the write command having the command ID of 1 is received, a write processing count corresponding to each of the eight LBAs from the offset of 8 to the offset of 15 in the zone #0 is incremented by 1.

Figure 10:
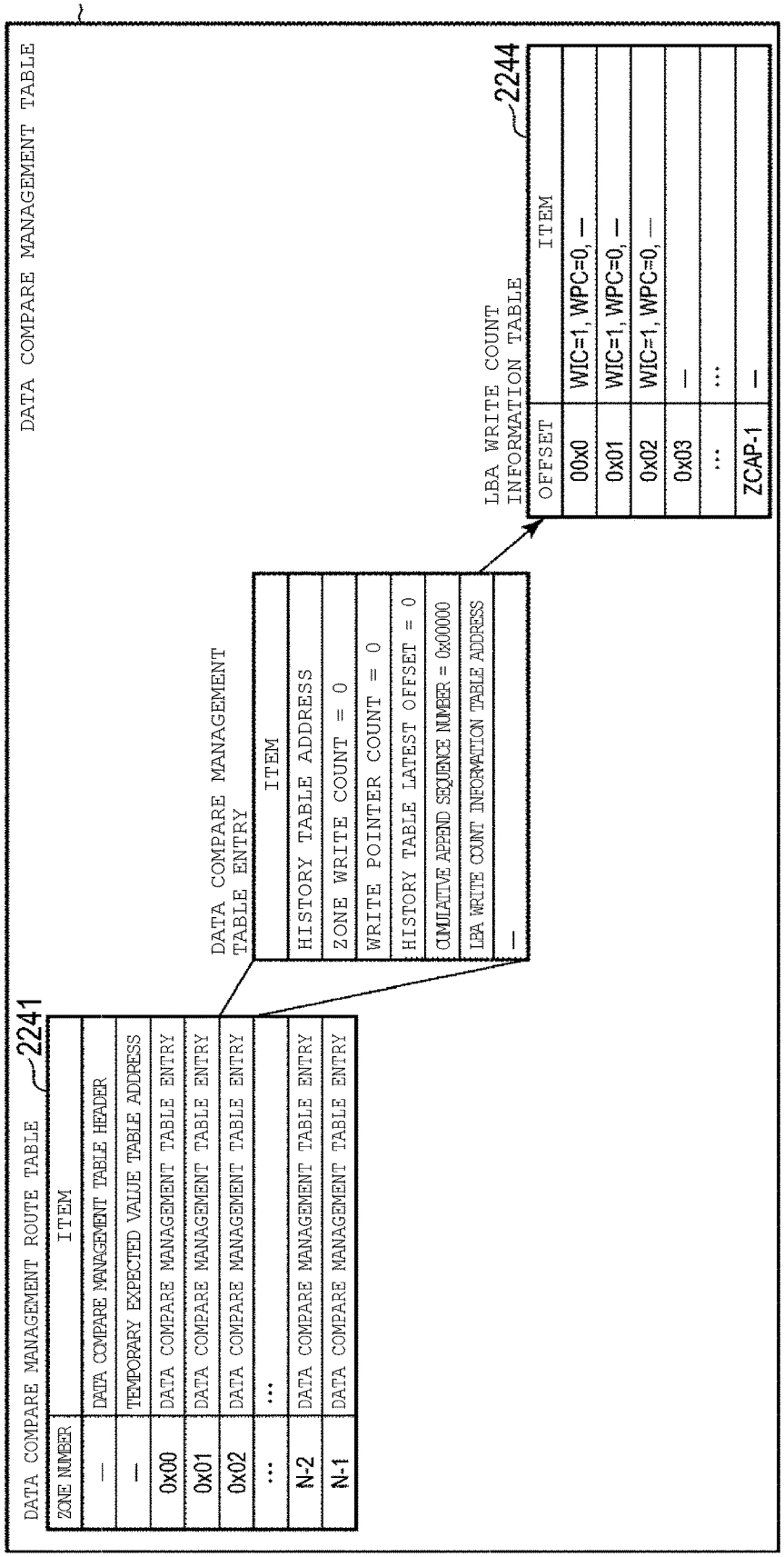
FIG. 10 is a diagram showing an example of values set in a data compare management table entry and the LBA write count information table when a write command is issued in the information processing device according to the embodiment of the present disclosure.

Next, values set in the data compare management table 224 when a write command is issued will be described. FIG. 10 is a diagram showing an example of values set in the data compare management table entry and the LBA write count information table when a write command is issued in the information processing device according to the embodiment of the present disclosure.

An issued write command designates an SLBA of a zone having a zone number "0x02". The SLBA is, for example, an LBA at an offset of 0x00 of the zone having the zone number "0x02", that is, a ZSLBA of the zone having the zone number "0x02". It is assumed that a data write operation for the zone corresponding to the zone number "0x02" has not been executed before this write command is issued. In such a case, the host write pointer history table 2243 corresponding to the zone having the zone number "0x02", the LBA write count information table 2244 corresponding to the zone having the zone number "0x02", and the alternative expected value table 2245 corresponding to the zone having the zone number "0x02" have not yet been created. Thus, in the data compare management table entry corresponding to the zone having the zone number "0x02", the history table address, the LBA write count information table address, and the alternative expected value table address are unset. In the data compare management table entry corresponding to the zone having the zone number "0x02", the zone write count, the write pointer count, and the history table latest offset are set to values indicating 0. The cumulative append sequence number is set to 0x00000 as an initial value.

When a write command is issued, the LBA write count information table 2244 corresponding to the zone number "0x02" is created. The LBA write count information table address of the data compare management table entry is set to a value indicating a storage area in memory 22 in which the created LBA write count information table 2244 is stored. All pieces of information stored in entries of the created LBA write count information table 2244 are unset.

The write command designates, for example, 3 as a data size of write data in addition to the SLBA (here, the ZSLBA of the zone having the zone number "0x02"). Thus, entries corresponding to the three LBAs from the offsets of 0x00 to 0x02 in the LBA write count information table 2244 are targets to be updated. The SLBA designated by the write command will also be referred to as a third logical address. A write issuing count (WIC) of the entry corresponding to the LBA at the offset of 0x00 in the LBA write count information table 2244 is incremented by 1. Consequently, the write issuing count (WIC) of the entry corresponding to the LBA at the offset of 0x00 is changed from 0 to 1. A write issuing count (WIC) of the entry corresponding to the LBA at the offset of 0x00 will also be referred to as a third write issuing count corresponding to the third logical address. A write processing count (WPC) of the entry corresponding to the LBA at the offset of 0x00 is maintained at a value indicating 0. A write issuing count of the entry corresponding to the LBA at the offset of 0x01 in the LBA write count information table 2244 is incremented by 1. Consequently, the write issuing count of the entry corresponding to the LBA at the offset of 0x01 is changed from 0 to 1. The write processing count of the entry corresponding to the LBA at the offset of 0x01 is maintained at a value indicating 0. The write issuing count of the entry corresponding to the LBA at the offset of 0x02 in the LBA write count information table 2244 is incremented by 1. Consequently, the write issuing count of the entry corresponding to the LBA at the offset of 0x02 is changed from 0 to 1. The write processing count of the entry corresponding to the LBA at the offset of 0x02 is maintained at a value indicating 0. Consequently, in each of the entries corresponding to the three LBAs from offset of 0x00 to 0x02, the write issuing count (WIC) is 1, the write processing count (WPC) is 0, and the control mode is unset. All pieces of information have been unset for entries corresponding to the offsets of 0x03 or more.

In a process of preparing the write data associated with the write command in the transfer data buffer 221 of the memory 22, the write issuing count stored in the LBA write count information table 2244 is referred to in order to embed a write count in each of the three sectors of the write data stored in the transfer data buffer 221.

Figure 11:
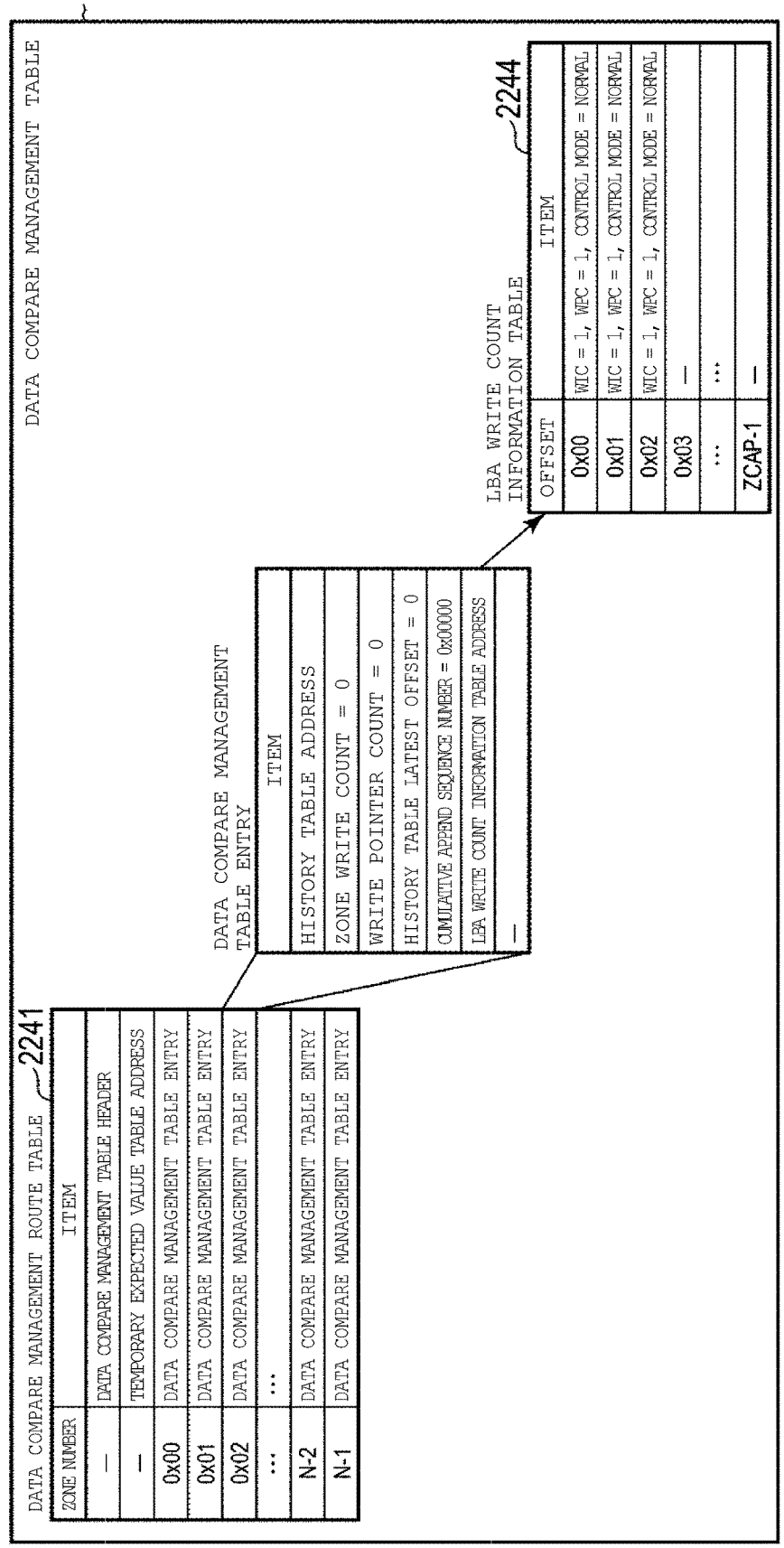
FIG. 11 is a diagram showing an example of values set in the LBA write count information table when a write command is completed in the information processing device according to the embodiment of the present disclosure.

Next, values set in the data compare management table 224 when a completion response corresponding to a write command is received will be described. FIG. 11 is a diagram showing an example of values set in the LBA write count information table when a write command is completed in the information processing device according to the embodiment of the present disclosure.

When a completion response corresponding to the write command described in FIG. 10 is received, the write processing count (WPC) of the entry corresponding to the LBA at the offset of 0x00 in the LBA write count information table 2244 is incremented by 1. Consequently, the write processing count (WPC) of the entry corresponding to the LBA at the offset of 0x00 is changed from 0 to 1. A control mode corresponding to the LBA at the offset of 0x00 is set to a value indicating the normal mode. The write processing count (WPC) of the entry corresponding to the LBA at the offset of 0x00 will also be referred to as a third write processing count corresponding to the third logical address. The write processing count (WPC) of the entry corresponding to the LBA at the offset of 0x01 is incremented by 1. Consequently, the write processing count (WPC) of the entry corresponding to the LBA at the offset of 0x01 is changed from 0 to 1. A control mode of the entry corresponding to the LBA at the offset of 0x01 is set to a value indicating the normal mode. The write processing count of the entry corresponding to the LBA at the offset of 0x02 is incremented by 1. Consequently, the write processing count (WPC) of the entry corresponding to the LBA at the offset of 0x02 is changed from 0 to 1. A control mode of the entry corresponding to the LBA at the offset of 0x02 is set to a value indicating the normal mode. As a result, in each of the entries corresponding to the three LBAs from the offsets of 0x00 to 0x02, the write issuing count (WIC) is set to 1, the write processing count (WPC) is set to 1, and the control mode is set to a value indicating the normal mode. All pieces of information have been unset for entries corresponding to the offsets of 0x03 or more.

In the data compare operation, each of the write processing counts (WPC) set in the LBA write count information table 2244 is compared with the write count embedded in the sector of the read data.

Next, an operation of evaluating the data integrity of read data that is read from a storage location corresponding to the third logical address will be described. The storage location corresponding to the third logical address is a storage location to which data has been written on the basis of the write command. Here, for example, a case is assumed in which a storage location corresponding to the LBA at the offset of 0x00 in the zone having the zone number "0x02" is a storage location to which data is written on the basis of a write command. After receiving a completion response corresponding to the write command for designating the LBA at the offset of 0x00 in the zone having the zone number "0x02", the processor 21 issues a read command for designating the LBA at the offset of 0x00 in the zone having the zone number "0x02" and requesting reading of data from a storage location corresponding to this LBA, to the memory system 3. This read command will also be referred to as a second read command. The second read command is a read command for requesting reading of data written on the basis of a write command. When read data based on the second read command is received, the processor 21 compares an LBA included in a head or an end of a sector of the received read data with an LBA designated by the read command. The processor 21 compares a write count included in the head or the end of the sector of the received read data with the write processing count (WPC) stored in the entry corresponding to the offset of 0x00 in the LBA write count information table 2244 corresponding to the zone having the zone number "0x02". The read data based on the second read command is read data that is read from the storage location corresponding to the third logical address. The read data based on the second read command will also be referred to as second read data. The processor 21 then evaluates the data integrity of the second read data on the basis of a result of the comparison.

Next, values set in the data compare management table 224 when two zone append commands are issued will be described. FIG. 12 is a diagram showing an example of values set in a data compare management table entry and a temporary expected value table when a zone append command is issued in the information processing device according to the embodiment of the present disclosure.

The two issued zone append commands both designate a ZSLBA of the zone corresponding to the zone number "0x02". When a data write operation for the zone having the zone number "0x02" has not been executed before issuing of these two zone append commands, the host write pointer history table 2243 corresponding to the zone having the zone number "0x02", the LBA write count information table 2244 corresponding to the zone having the zone number "0x02", and the alternative expected value table 2245 corresponding to the zone having the zone number "0x02" have not yet been created. Thus, in the data compare management table entry corresponding to the zone having the zone number "0x02", the history table address, the LBA write count information table address, and the alternative expected value table address are unset. In the data compare management table entry corresponding to the zone having the zone number "0x02", the zone write count, the write pointer count, and the history table latest offset are set to values indicating 0. The cumulative append sequence number is set to 0x00000 as an initial value.

When the first zone append command is issued, the LBA write count information table 2244 corresponding to the zone having the zone number "0x02" and the alternative expected value table 2245 corresponding to the zone having the zone number "0x02" are created in the memory 22. The LBA write count information table address of the data compare management table entry is set to a value indicating a storage area in memory 22 in which the created LBA write count information table 2244 is stored. The alternative expected value table address of the data compare management table entry is set to a value indicating a storage area in the memory 22 in which the created alternative expected value table 2245 is stored. All pieces of information stored in respective entries of the created LBA write count information table 2244 and alternative expected value table 2245 are unset.

When the first zone append command is stored in the slot of CID=0 in the SQ of SQID=1, temporary expected values (that is, a zone number and an append sequence number (ASN)) are stored in an entry of the temporary expected value table 2242 corresponding to the combination of SQID=1 and CID=0. In this case, the zone number "0x02" corresponding to the ZSLBA designated by the first zone append command is stored in the entry of the temporary expected value table 2242 corresponding to the combination of SQID=1 and CID=0. The cumulative append sequence number "0x00000" stored in the data compare management table entry corresponding to the zone corresponding to the zone number "0x02" is stored in the entry of the temporary expected value table 2242 corresponding to the combination of SQID=1 and CID=0. When a data size designated by the first zone append command is 16, the cumulative append sequence number corresponding to the zone number "0x02" is incremented by 16. Consequently, the cumulative append sequence number corresponding to the zone number "0x02" is changed from 0x00000 to 0x00010.

When the second zone append command is stored in the slot of CID=1 in the SQ of SQID=1, temporary expected values (that is, a zone number and an append sequence number (ASN)) are stored in an entry of the temporary expected value table 2242 corresponding to the combination of SQID=1 and CID=1. In this case, the zone number "0x02" corresponding to the ZSLBA designated by the second zone append command is stored in the entry of the temporary expected value table 2242 corresponding to the combination of SQID=1 and CID=1. The cumulative append sequence number "0x0000" stored in the data compare management table entry corresponding to the zone corresponding to the zone number "0x02" is stored in the entry of the temporary expected value table 2242 corresponding to the combination of SQID=1 and CID=1. When a data size designated by the second zone append command is 16, the cumulative append sequence number corresponding to the zone number "0x02" is incremented by 16. Consequently, the cumulative append sequence number corresponding to the zone number "0x02" is changed from 0x00010 to 0x00020.

In a process of preparing the write data associated with the first zone append command in the transfer data buffer 221 of the memory 22, a zone number and an append sequence number are embedded as identification information in a head or an end of each of the sixteen sectors included in the write data stored in the transfer data buffer 221. The zone number embedded in the head or the end of each of the sixteen sectors is the zone number "0x02" stored in the entry of the temporary expected value table 2242 corresponding to SQID=1 and CID=0. When the append sequence number is embedded in the head or the end of each of the sixteen sectors, the append sequence number stored in the entry of the temporary expected value table 2242 corresponding to SQID=1 and CID=0 is incremented for each sector. Thus, for example, the append sequence number embedded in the head or the end of the first sector out of the sixteen sectors is the append sequence number "0x00000" stored in the entry of the temporary expected value table 2242 corresponding to SQID=1 and CID=0. The append sequence number embedded in the head or the end of the second sector out of the sixteen sectors is 0x00001. The append sequence number embedded in the head or the end of the last sector out of the sixteen sectors is 0x0000F.

In a process of preparing the write data associated with the second zone append command in the transfer data buffer 221 of the memory 22, a zone number and an append sequence number are embedded as identification information in a head or an end of each of the sixteen sectors included in the write data stored in the transfer data buffer 221. The zone number embedded in the head or the end of each of the sixteen sectors is the zone number "0x02" stored in the entry of the temporary expected value table 2242 corresponding to SQID=1 and CID=1. When the append sequence number is embedded in the head or the end of each of the sixteen sectors, the append sequence number stored in the entry of the temporary expected value table 2242 corresponding to SQID=1 and CID=1 is incremented for each sector. Thus, for example, the append sequence number embedded in the head or the end of the first sector out of the sixteen sectors is the append sequence number "0x00010" stored in the entry of the temporary expected value table 2242 corresponding to SQID=1 and CID=1. The append sequence number embedded in the head or the end of the second sector out of the sixteen sectors is 0x00011. The append sequence number embedded in the head or the end of the last sector out of the sixteen sectors is 0x0001F.

Figure 13:
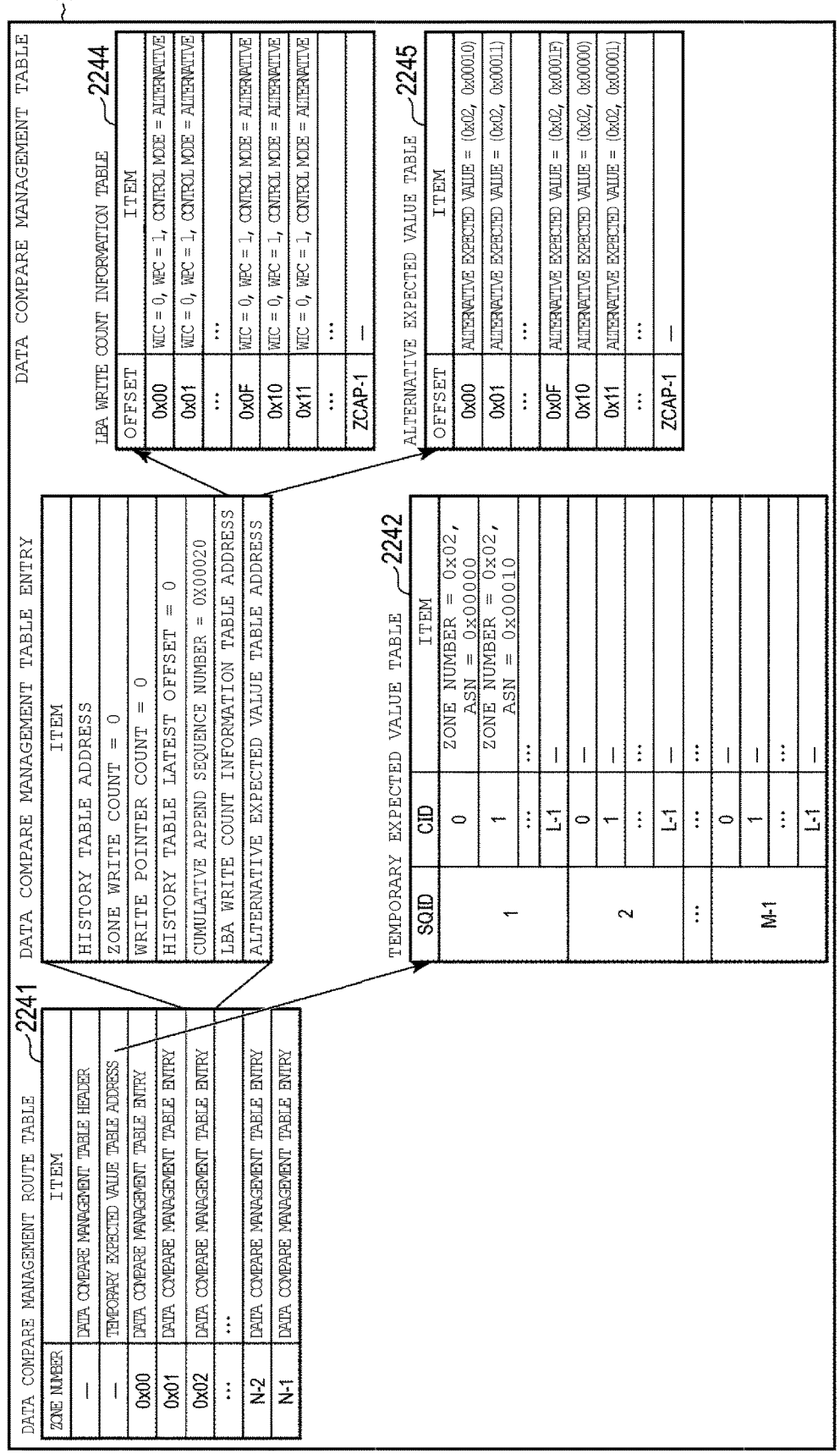
FIG. 13 is a diagram showing an example of values set in the LBA write count information table and an alternative expected value table when the zone append command is completed in the information processing device according to the embodiment of the present disclosure.

Next, values set in the data compare management table 224 when a completion response corresponding to the zone append command is received will be described. FIG. 13 is a diagram showing an example of values set in the LBA write count information table and the alternative expected value table when the zone append command is completed in the information processing device according to the embodiment of the present disclosure. Received completion responses are two completion responses corresponding to the two zone append commands described in FIG. 12.

Here, of the two issued zone append commands, a case where the second zone append command corresponding to CID=1 is processed before the first zone append command corresponding to CID=0 will be described.

Since the second zone append command is processed before the first zone append command, a completion response indicating the completion of the second zone append command corresponding to CID=1 is first received as a first completion response. The first completion response includes SQID=1 from which the second zone append command has been fetched, CID=1 of the second zone append command, and an LBA corresponding to a storage location to which the write data associated with the second zone append command is actually written. When the second zone append command is first processed by the memory system 3, the write data associated with the second zone append command is written to sixteen storage locations in the zone having the zone number "0x02" respectively corresponding to sixteen LBAs from the offset of 0x00 to the offset of 0x0F of the zone having the zone number "0x02". Thus, the LBA included in the first completion response indicates the offset of 0x00 of the zone number "0x02", that is, a ZSLBA of the zone having the zone number "0x02". In this case, the ZSLBA of the zone having the zone number "0x02" is the first logical address corresponding to the storage location to which the write data is written on the basis of the second zone append command.

On the basis of the first completion response, alternative expected values are respectively stored in entries corresponding to sixteen LBAs from the offsets of 0x00 to 0x0F in the alternative expected value table 2245 corresponding to the zone having the zone number "0x02". The alternative expected value table 2245 corresponding to the zone having the zone number "0x02" is a table that stores an expected value of read data corresponding to the zone having the zone number "0x02" for each LBA of the zone having the zone number "0x02". The alternative expected value stored in each of the entries of the alternative expected value table 2245 is an expected value of the read data that is read from the storage location corresponding to the LBA associated with the entry. In this case, the zone number and the append sequence number stored in the entry corresponding to SQID=1 and CID=1 in the temporary expected value table 2242 are referred to.

For example, alternative expected values including a value indicating the zone number "0x02" and a value indicating the append sequence number "0x00010" are stored as expected values used to evaluate the data integrity of the read data corresponding to the LBA at the offset of 0x00, in the entry corresponding to the LBA at the offset of 0x00 in the alternative expected value table 2245. Alternative expected values including a value indicating the zone number "0x02" and a value indicating the append sequence number "0x00011" are stored as expected values used to evaluate the data integrity of the read data corresponding to the LBA at the offset of 0x01, in the entry corresponding to the LBA at the offset of 0x01 in the alternative expected value table 2245. Alternative expected values including a value indicating the zone number "0x02" and a value indicating the append sequence number "0x0001F" are stored as expected values used to evaluate the data integrity of the read data corresponding to the LBA at the offset of 0x0F, in the entry corresponding to the LBA at the offset of 0x0F in the alternative expected value table 2245. As described above, the alternative expected values including the value indicating the zone number "0x02" and the values (specifically, 0x00011 to 0x0001F) indicating numbers obtained by incrementing the append sequence number "0x0000" by 1 for each LBA are respectively stored in the entries of the alternative expected value table 2245 corresponding to the fifteen LBAs from the offset of 0x01 to the offset of x0F.

The write processing count (WPC) stored in each of the entries corresponding to the sixteen LBAs from the offsets of 0x00 to 0x0F in the LBA write count information table 2244 corresponding to the zone having the zone number "0x02" is incremented by 1. The LBA write count information table 2244 corresponding to the zone having the zone number "0x02" is a table that stores the number of times of writing (for example, a write processing count) corresponding to each of a plurality of LBAs in the zone having the zone number "0x02". In the LBA write count information table 2244, a control mode stored in each of the entries corresponding to the sixteen LBAs from the offset of 0x00 to the offset of 0x0F is set to a value indicating the alternative mode. Consequently, in each of the entries corresponding to the sixteen LBAs from the offsets of 0x00 to 0x0F, the write issuing count is set to 0, the write processing count is set to 1, and the control mode is set to a value indicating the alternative mode.

A completion response indicating completion of the first zone append command is then received as a second completion response. The second completion response includes SQID=1 from which the first zone append command has been fetched, CID=0 of the first zone append command, and an LBA corresponding to a storage location to which the write data associated with the first zone append command is actually written. When the first zone append command is processed by the memory system 3 after the second zone append command, the write data associated with the first zone append command is written to sixteen storage locations respectively corresponding to the sixteen LBAs from the offset of 0x10 to the offset of 0x1F of the zone having the zone number "0x02". Thus, the LBA included in the second completion response indicates the offset of 0x10 of the zone number "0x02".

On the basis of the second completion response, the alternative expected values are respectively stored in the entries of the alternative expected value table 2245 corresponding to the sixteen LBAs from the offsets of 0x10 to 0x1F. In this case, the zone number and the append sequence number stored in the entry of the temporary expected value table 2242 corresponding to SQID=1 and CID=0 are referred to.

For example, alternative expected values including a value indicating the zone number "0x02" and a value indicating the append sequence number "0x00000" are stored as expected values used to evaluate the data integrity of the read data that is read from the storage location corresponding to the LBA at the offset of 0x10, in the entry corresponding to the LBA at the offset of 0x10 in the alternative expected value table 2245. The alternative expected values including the value indicating the zone number "0x02" and the values (specifically, 0x00001 to 0x0000F) indicating numbers obtained by incrementing the append sequence number "0x00000" by 1 for each LBA are respectively stored in the entries of the alternative expected value table 2245 corresponding to the fifteen LBAs from the offset of 0x11 to the offset of 0x1F.

The write processing count (WPC) stored in each of the entries corresponding to the sixteen LBAs from the offsets of 0x10 to 0x1F in the LBA write count information table 2244 corresponding to the zone having the zone number "0x02" is incremented by 1. A control mode stored in each of the entries corresponding to the sixteen LBAs from the offset of 0x10 to the offset of 0x1F is set to a value indicating the alternative mode. Consequently, in each of the entries corresponding to the sixteen LBAs from the offsets of 0x10 to 0x1F, the write issuing count is set to 0, the write processing count is set to 1, and the control mode is set to a value indicating the alternative mode.

In the data compare operation for the data read from the storage location corresponding to the LBA of which a control mode is set to the value indicating the alternative mode, the alternative expected values stored in the alternative expected value table 2245 are compared with the identification information embedded in the sector of the read data. For example, when data is read from the storage location corresponding to the LBA corresponding to the offset of 0x00 of the zone having the zone number "0x02", the alternative expected values (that is, the zone number and the append sequence number) stored in the entry corresponding to the offset of 0x00 in the alternative expected value table 2245 corresponding to the zone having the zone number "0x02" are compared with the identification information (that is, the zone number and the append sequence number) embedded in the sector of the read data. The alternative expected value table 2245 corresponding to the zone having the zone number "0x02" will also be referred to as a first expected value table. The alternative expected value stored in each entry of the alternative expected value table 2245 corresponding to the first logical address in the zone having the zone number "0x02" will also be referred to as a first expected value. The first expected value is an expected value used to evaluate the data integrity of read data that is read from the storage location corresponding to the first logical address. The LBA write count information table 2244 corresponding to the zone having the zone number "0x02" will also be referred to as a first write count information table.

Next, an operation of evaluating the data integrity of the read data that is read from the storage location corresponding to the first logical address will be described. The storage location corresponding to the first logical address is a storage location to which data has been written on the basis of the zone append command. Here, for example, a case is assumed in which a storage location corresponding to an LBA at the offset of 0x00 in the zone having the zone number "0x02" is a storage location to which data is written on the basis of the zone append command. The processor 21 issues, to the memory system 3, a read command for designating the LBA at the offset of 0x00 in the zone having the zone number "0x02" and requesting reading of data from a storage location corresponding to the LBA. This read command will also be referred to as a first read command. When the processor 21 receives read data based on the first read command, the processor 21 compares information included in a head or an end of a sector of the received read data with the alternative expected values (the zone number and the append sequence number) stored in the entry corresponding to the offset of 0x00 in the alternative expected value table 2245 corresponding to the zone having the zone number "0x02". The read data based on the first read command is read data that is read from the storage location corresponding to the first logical address. The read data based on the first read command will also be referred to as first read data. The processor 21 then evaluates the data integrity of the first read data on the basis of a result of the comparison.

Figure 14:
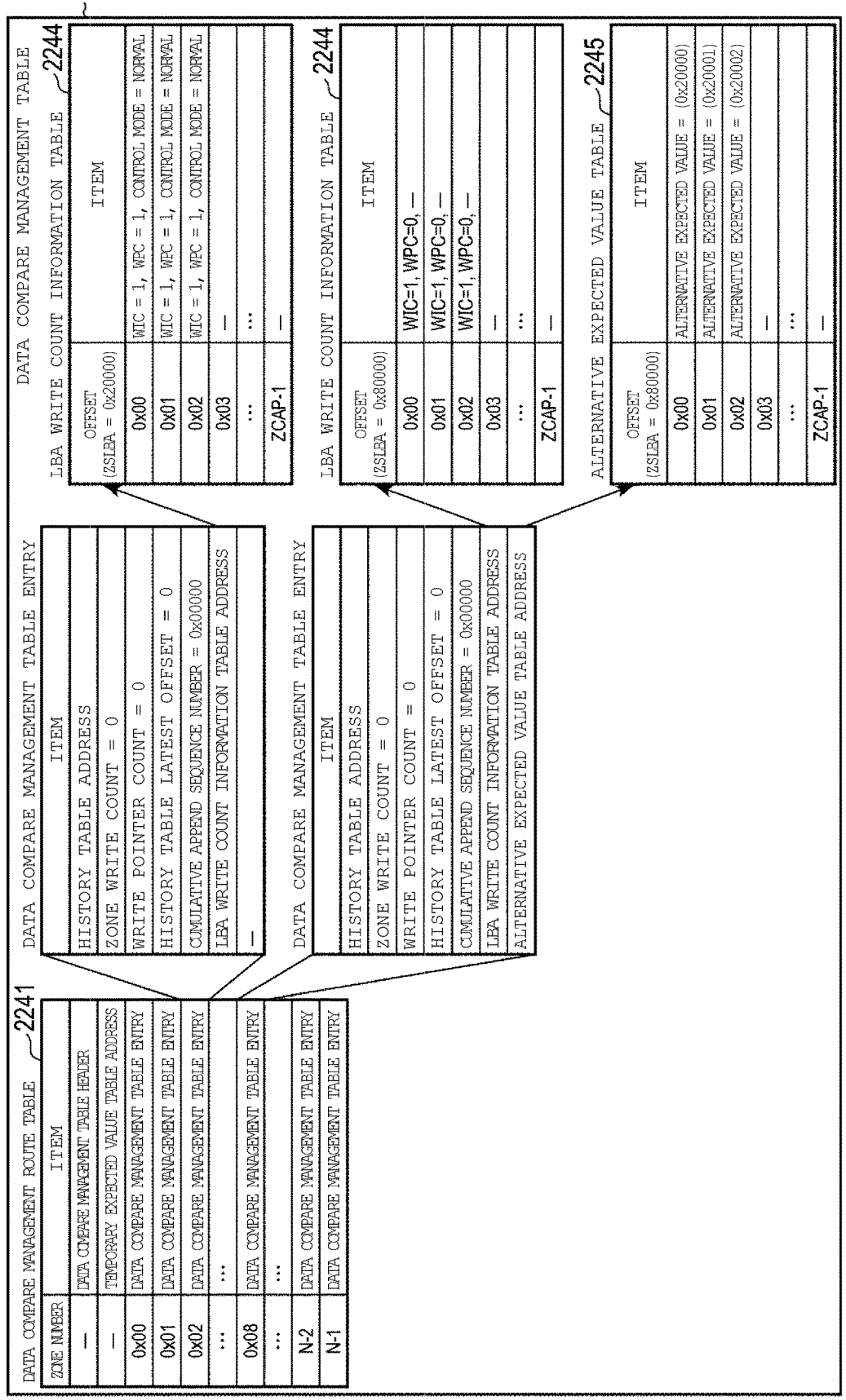
FIG. 14 is a diagram showing a first example of values set in the LBA write count information table corresponding to a copy destination zone and the alternative expected value table corresponding to the copy destination zone when a copy command is issued in the information processing device according to the embodiment of the present disclosure.

Next, values that are set in the data compare management table 224 when a copy command for designating an LBA corresponding to a storage location to which data is written on the basis of a write command as a copy source LBA is issued will be described. FIG. 14 shows a first example of values set in the LBA write count information table corresponding to a copy destination zone and the alternative expected value table corresponding to a copy destination zone when a copy command is issued in the information processing device according to the embodiment of the present disclosure.

A copy source LBA designated by the issued copy command is, for example, an LBA at the offset of 0x00 in the zone having the zone number "0x02", that is, a ZSLBA (=0x20000) of the zone having the zone number "0x02". A copy destination LBA designated by the issued copy command is, for example, an LBA at the offset of 0x00 in the zone having the zone number "0x08", that is, a ZSLBA (=0x80000) of the zone having the zone number "0x08". A data size designated by the issued copy command is 3, for example. The issued copy command is a copy command for designating an LBA corresponding to a storage location to which data is written on the basis of a write command as a copy source LBA. Thus, the issued copy command will also be referred to as a second copy command. A copy destination LBA designated by the issued copy command will also be referred to as a fourth logical address. Therefore, for example, the LBA at the offset of 0x00 of the zone having the zone number "0x08" is the fourth logical address.

Before the copy command is issued, data based on the write command is written to three storage locations respectively corresponding to three LBAs at the offsets of 0x00 to 0x02 in the zone having the zone number "0x02". Thus, the write issuing count (WIC) is set to 1, the write processing count (WPC) is set to 1, and a control mode is set to a value indicating the normal mode in each of the entries corresponding to the three LBAs at the offsets of 0x00 to 0x02 in the LBA write count information table 2244 corresponding to the zone having the zone number "0x02".

When the copy command is issued, the copy source LBA designated by the copy command is stored in the alternative expected value table 2245 corresponding to the copy destination zone as an alternative expected value corresponding to the copy destination LBA. The copy destination zone is the zone having the zone number "0x08". Thus, the alternative expected value is stored in the alternative expected value table 2245 corresponding to the zone having the zone number "0x08". The alternative expected value table 2245 corresponding to the zone having the zone number "0x08" will also be referred to as a third expected value table. For example, 0x20000 that is the copy source LBA designated by the copy command is stored in an entry corresponding to the LBA at the offset of 0x00 in the alternative expected value table 2245 corresponding to the zone having the zone number "0x08". In addition, 0x20001 that is a value obtained by incrementing the copy source LBA by 1 is stored in an entry corresponding to the LBA at the offset of 0x01 in the alternative expected value table 2245 corresponding to the zone having the zone number "0x08". Further, 0x20002 that is a value obtained by incrementing the copy source LBA by 2 is stored in an entry corresponding to the LBA at the offset of 0x02 in the alternative expected value table 2245 corresponding to the zone having the zone number "0x08". Each of 0x20000, 0x20001, and 0x20002 will also be referred to as a third expected value. The third expected value is an expected value used to evaluate the data integrity of read data that is read from a storage location corresponding to the copy destination LBA. In other words, the copy source LBA is stored as the third expected value used to evaluate the data integrity of the read data that is read from the storage location corresponding to the copy destination LBA in each of the entries of the alternative expected value table 2245 corresponding to the zone having the zone number "0x08".

The write issuing count (WIC) corresponding to the copy destination LBA is set to the same value as the write issuing count (WIC) corresponding to the copy source LBA. The copy source LBA (specifically, 0x20000) is an LBA at the offset of 0x00 in the zone having the zone number "0x02". The copy destination LBA (specifically, 0x80000) is an LBA at the offset of 0x00 in the zone having the zone number "0x08". Therefore, the WIC is read from the entry at the offset of 0x00 in the LBA write count information table 2244 corresponding to the zone having the zone number "0x02". The read WIC is set in the entry at the offset of 0x00 in the LBA write count information table 2244 corresponding to the zone having the zone number "0x08". The LBA write count information table 2244 corresponding to the zone having the zone number "0x02" will also be referred to as a first write count information table that is a table storing write count information indicating the number of times of writing for each logical address included in the zone having the zone number "0x02". The LBA write count information table 2244 corresponding to the zone having the zone number "0x08" will also be referred to as a second write count information table that is a table storing write count information indicating the number of times of writing for each logical address included in the zone having the zone number "0x08". The WIC is read from the entry at the offset of 0x01 in the LBA write count information table 2244 corresponding to the zone having the zone number "0x02". The read WIC is stored in the entry at the offset of 0x01 in the LBA write count information table 2244 corresponding to the zone having the zone number "0x08". The WIC is read from the entry at the offset of 0x02 in the LBA write count information table 2244 corresponding to the zone having the zone number "0x02". The read WIC is stored in the entry at the offset of 0x02 in the LBA write count information table 2244 corresponding to the zone having the zone number "0x08". As a result, the WICs corresponding to the three LBAs from 0x80000 to 0x80002 are set to the same value (here, 1) as the WICs corresponding to the three LBAs from 0x20000 to 0x20002. The WIC stored in the entry at the offset of 0x01 (or the offset of 0x02) in the LBA write count information table 2244 corresponding to the zone having the zone number "0x08" will also be referred to as a write issuing count corresponding to the fourth logical address.

Figure 15:
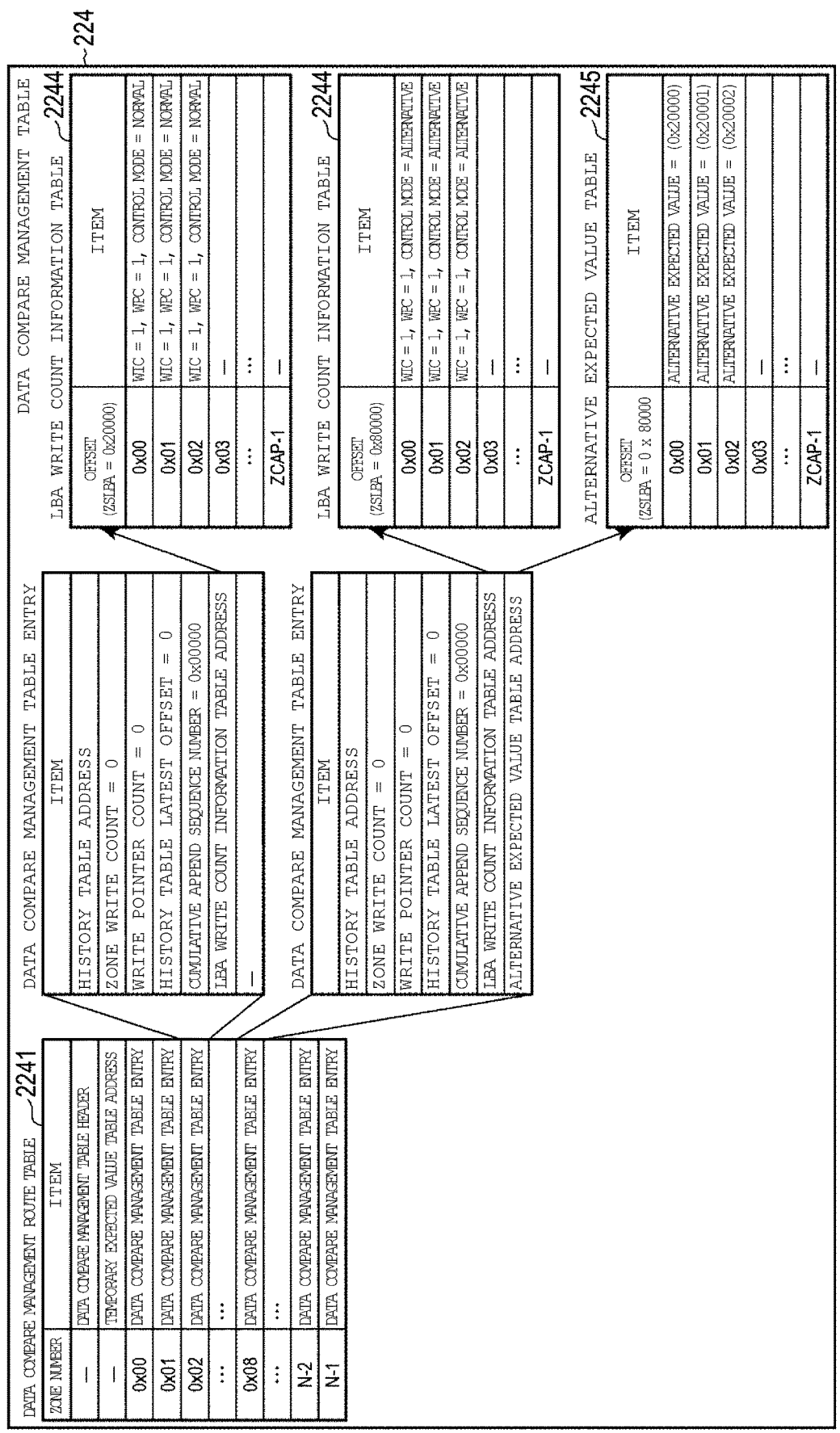
FIG. 15 is a diagram showing a first example of values set in the LBA write count information table corresponding to the copy destination zone when the copy command is completed in the information processing device according to the embodiment of the present disclosure.

Next, values set in the data compare management table 224 when a completion response corresponding to the copy command is received will be described. FIG. 15 is a diagram showing a first example of values set in the LBA write count information table corresponding to a copy destination zone when the copy command is completed in the information processing device according to the embodiment of the present disclosure.

When the received completion response is a completion response corresponding to the copy command described with reference to FIG. 14, the write processing count (WPC) corresponding to the copy destination LBA is set to the same value as the write processing count (WPC) corresponding to the copy source LBA. In this case, the WPC is read from the entry at the offset of 0x00 in the LBA write count information table 2244 corresponding to the zone having the zone number "0x02". The read WPC is stored in the entry at the offset of 0x00 in the LBA write count information table 2244 corresponding to the zone having the zone number "0x08". The WPC is read from the entry at the offset of 0x01 in the LBA write count information table 2244 corresponding to the zone having the zone number "0x02". The read WPC is stored in the entry at the offset of 0x01 in the LBA write count information table 2244 corresponding to the zone having the zone number "0x08". The WPC is read from the entry at the offset of 0x02 in the LBA write count information table 2244 corresponding to the zone having the zone number "0x02". The read WPC is stored in the entry at the offset of 0x02 in the LBA write count information table 2244 corresponding to the zone having the zone number "0x08". As a result, the WPC corresponding to the three LBAs from 0x80000 to 0x80002 is set to the same value (here, 1) as the WPC corresponding to the three LBAs from 0x20000 to 0x20002. The WPC stored in, for example, the entry at the offset of 0x00 in the LBA write count information table 2244 corresponding to the zone having the zone number "0x08" will also be referred to as a write processing count corresponding to the fourth logical address.

A control mode of the entry corresponding to the LBA at the offset of 0x00 in the LBA write count information table 2244 corresponding to the zone having the zone number "0x08" is set to a value indicating the alternative mode. A control mode of the entry corresponding to the LBA at the offset of 0x01 in the LBA write count information table 2244 corresponding to the zone having the zone number "0x08" is set to a value indicating the alternative mode. A control mode of the entry corresponding to the LBA at the offset of 0x02 in the LBA write count information table 2244 corresponding to the zone corresponding to the zone number "0x08" is set to a value indicating the alternative mode.

In a data compare operation for data read from a storage location corresponding to an LBA of which a control mode is set to a value indicating the alternative mode, the alternative expected value (LBA) set in the corresponding alternative expected value table 2245 is compared with an LBA embedded in the sector of the read data. For example, a case is assumed in which data is read from a storage location corresponding to an LBA corresponding to the offset of 0x00 of the zone having the zone number "0x08". In this case, the LBA stored in the entry corresponding to the offset of 0x00 in the alternative expected value table 2245 corresponding to the zone having the zone number "0x08" is compared with an LBA embedded in the sector of the read data. A WPC stored in the entry corresponding to offset of 0x00 in the LBA write count information table 2244 corresponding to the zone having the zone number "0x08" is compared with a write count embedded in the sector of the read data.

Figure 16:
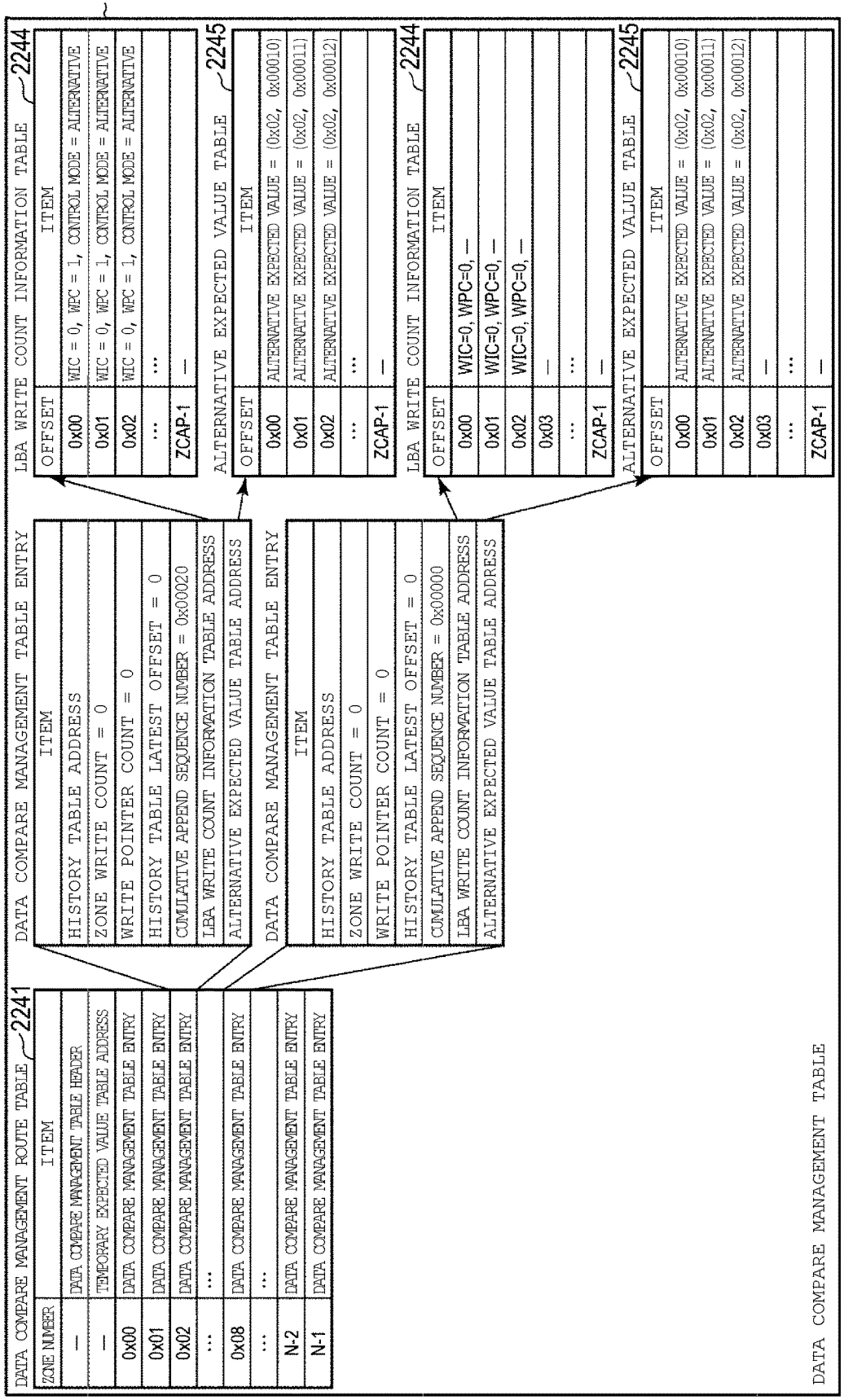
FIG. 16 is a diagram showing a second example of values set in the LBA write count information table corresponding to a copy destination zone and the alternative expected value table corresponding to the copy destination zone when the copy command is issued in the information processing device according to the embodiment of the present disclosure.

Next, values set in the data compare management table 224 when a copy command for designating an LBA corresponding to a storage location to which data is written on the basis of a zone append command as a copy source LBA is issued will be described. FIG. 16 is a diagram showing a second example of values set in the LBA write count information table corresponding to a copy destination zone and the alternative expected value table corresponding to the copy destination zone when a copy command is issued in the information processing device according to the embodiment of the present disclosure.

A copy source LBA designated by the issued copy command is, for example, an LBA at the offset of 0x00 in the zone having the zone number "0x02", that is, a ZSLBA (=0x20000) of the zone having the zone number "0x02". A copy destination LBA designated by the issued copy command is, for example, an LBA at the offset of 0x00 in the zone having the zone number "0x08", that is, a ZSLBA (=0x80000) of the zone having the zone number "0x08". A data size designated by the issued copy command is 3, for example. The issued copy command is a copy command for designating an LBA corresponding to the storage location to which the data is written on the basis of the zone append command as a copy source LBA. Thus, the issued copy command will also be referred to as a first copy command. The copy destination LBA designated by the issued copy command will also be referred to as a second logical address. Therefore, for example, the LBA at the offset of 0x00 in the zone having the zone number "0x08" is the second logical address.

Before the copy command is issued, data based on the zone append command is written to three storage locations respectively corresponding to three LBAs at the offsets of 0x00 to 0x02 in the zone having the zone number "0x02". Thus, the write issuing count (WIC) is set to 0, the write processing count (WPC) is set to 1, and a control mode is set to a value indicating the alternative mode in each of the entries corresponding to the three LBAs at the offsets of 0x00 to 0x02 in the LBA write count information table 2244 corresponding to the zone having the zone number "0x02".

The expected value of the read data corresponding to each of the three LBs is stored as an alternative expected value in each of the entries corresponding to the three LBAs at the offsets of 0x00 to 0x02 in the alternative expected value table 2245 corresponding to the zone having the zone number "0x02". In the entry corresponding to the LBA at the offset of 0x00, the zone number "0x02" and the zone append sequence number "0x0000" are stored as expected values of the read data corresponding to the LBA at the offset of 0x00. In the entry corresponding to the LBA at the offset of 0x01, the zone number "0x02" and the zone append sequence number "0x0001" are stored as expected values of the read data corresponding to the LBA at the offset of 0x01. In the entry corresponding to the LBA at the offset of 0x02, the zone number "0x02" and the zone append sequence number "0x00012" are stored as expected values of the read data corresponding to the LBA at the offset of 0x02.

When the copy command is issued, an alternative expected value corresponding to the copy source LBA (that is, the expected value of the read data corresponding to the copy source LBA) is copied from the alternative expected value table 2245 corresponding to the copy source zone to the alternative expected value table 2245 corresponding to the copy destination zone as an alternative expected value corresponding to the copy destination LBA. The copy source zone is the zone having the zone number "0x02". The copy source LBA is the LBA at the offset of 0x00 in the zone having the zone number "0x02". The copy destination zone is the zone having the zone number "0x08". The copy destination LBA is the LBA at the offset of 0x00 in the zone having the zone number "0x08". Thus, the alternative expected values (specifically, 0x02 and 0x0010) corresponding to the LBA at the offset of 0x00 in the zone having the zone number "0x02" are read from the alternative expected value table 2245 corresponding to the zone having the zone number "0x02". The read alternative expected values are stored in the entry corresponding to the LBA at the offset of 0x00 in the alternative expected value table 2245 corresponding to the zone having the zone number "0x08". The alternative expected values (specifically, 0x02 and 0x0011) corresponding to the LBA at the offset of 0x01 in the zone having the zone number "0x02" are read from the alternative expected value table 2245 corresponding to the zone having the zone number "0x02". The read alternative expected values are stored in the entry corresponding to the LBA at the offset of 0x01 in the alternative expected value table 2245 corresponding to the zone having the zone number "0x08". The alternative expected values (specifically, 0x02 and 0x0012) corresponding to the LBA at the offset of 0x02 of the zone having the zone number "0x02" are read from the alternative expected value table 2245 corresponding to the zone having the zone number "0x02". The read alternative expected values are stored in the entry corresponding to the LBA at the offset of 0x02 in the alternative expected value table 2245 corresponding to the zone having the zone number "0x08". The alternative expected value table 2245 corresponding to the zone having the zone number "0x08" will also be referred to as a second expected value table. The alternative expected value stored in the entry corresponding to, for example, the LBA at the offset of 0x00 in the alternative expected value table 2245 corresponding to the zone having the zone number "0x08" will also be referred to as a second expected value. The second expected value is an expected value used to evaluate the data integrity of read data that is read from the storage location corresponding to the second logical address.

Figure 17:
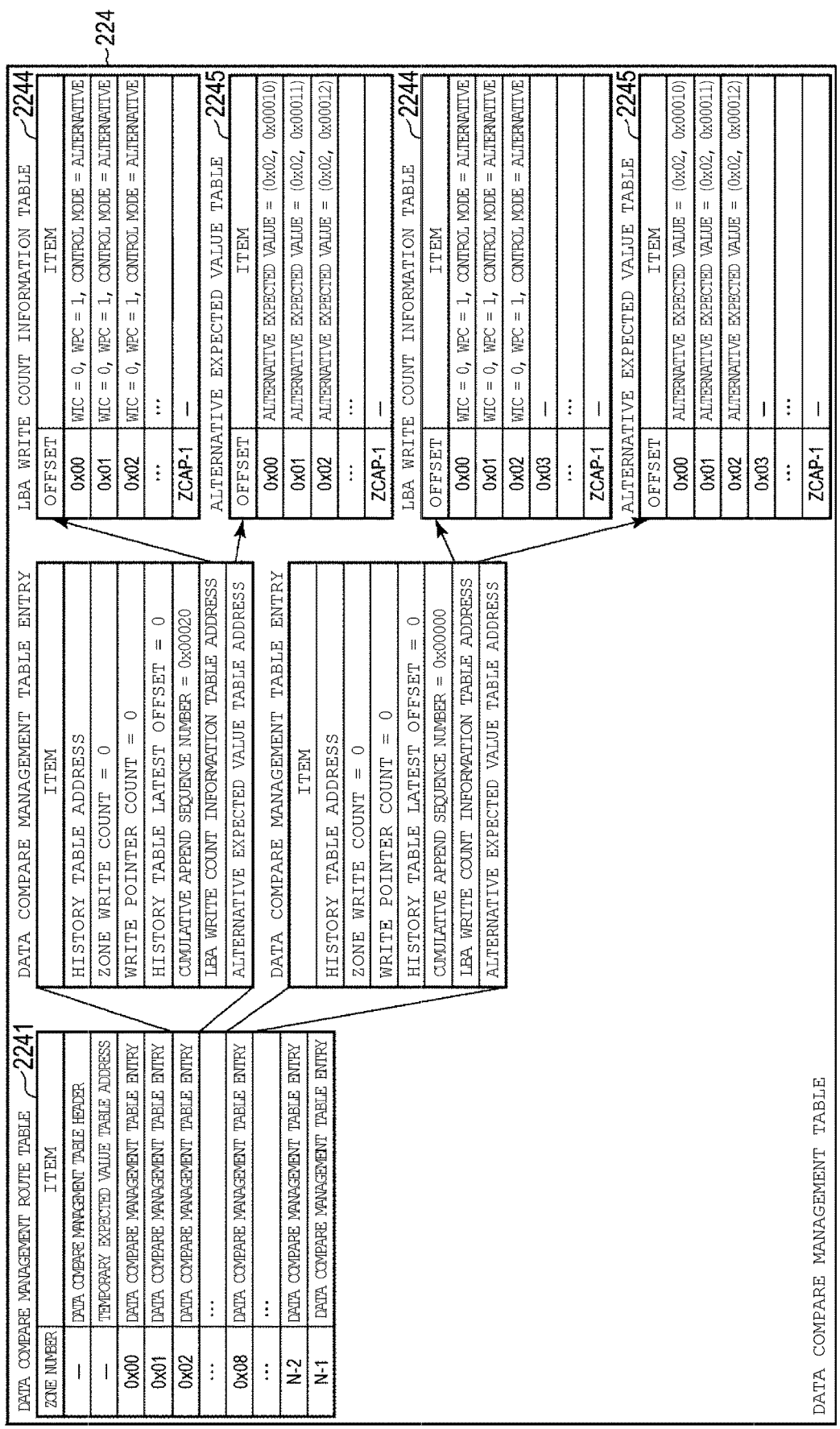
FIG. 17 is a diagram showing a second example of values set in the LBA write count information table corresponding to the copy destination zone when the copy command is completed in the information processing device according to the embodiment of the present disclosure.

Next, values set in the data compare management table 224 when a completion response corresponding to the copy command is received will be described. FIG. 17 is a diagram showing a second example of values set in the LBA write count information table corresponding to a copy destination zone when a copy command is completed in the information processing device according to the embodiment of the present disclosure.

When the received completion response is a completion response corresponding to the copy command described with reference to FIG. 16, the write processing count (WPC) corresponding to the copy destination LBA is set to the same value as the write processing count (WPC) corresponding to the copy source LBA. In this case, the WPC is read from the entry at the offset of 0x00 in the LBA write count information table 2244 corresponding to the zone having the zone number "0x02". The read WPC is stored in the entry at the offset of 0x00 in the LBA write count information table 2244 corresponding to the zone having the zone number "0x08". The WPC is read from the entry at the offset of 0x01 in the LBA write count information table 2244 corresponding to the zone having the zone number "0x02". The read WPC is stored in the entry at the offset of 0x01 in the LBA write count information table 2244 corresponding to the zone having the zone number "0x08". The WPC is read from the entry at the offset of 0x02 in the LBA write count information table 2244 corresponding to the zone having the zone number "0x02". The read WPC is stored in the entry at the offset of 0x02 in the LBA write count information table 2244 corresponding to the zone having the zone number "0x08".

A control mode of the entry corresponding to the LBA at the offset of 0x00 in the LBA write count information table 2244 corresponding to the zone having the zone number "0x08" is set to a value indicating the alternative mode. A control mode of the entry corresponding to the LBA at the offset of 0x01 in the LBA write count information table 2244 corresponding to the zone having the zone number "0x08" is set to a value indicating the alternative mode. A control mode of the entry corresponding to the LBA at the offset of 0x02 in the LBA write count information table 2244 corresponding to the zone corresponding to the zone number "0x08" is set to a value indicating the alternative mode.

In a data compare operation for data read from a storage location corresponding to an LBA of which a control mode is set to a value indicating the alternative mode, the alternative expected value stored in the corresponding alternative expected value table 2245 is compared with the identification information embedded in the sector of the read data. For example, a case is assumed in which data is read from a storage location corresponding to an LBA corresponding to the offset of 0x00 of the zone having the zone number "0x08". In this case, the alternative expected values (that is, the zone number and the append sequence number) stored in the entry corresponding to the offset of 0x00 in the alternative expected value table 2245 corresponding to the zone having the zone number "0x08" are compared with the identification information (that is, the zone number and the append sequence number) embedded in the sector of the read data.

Figure 18:
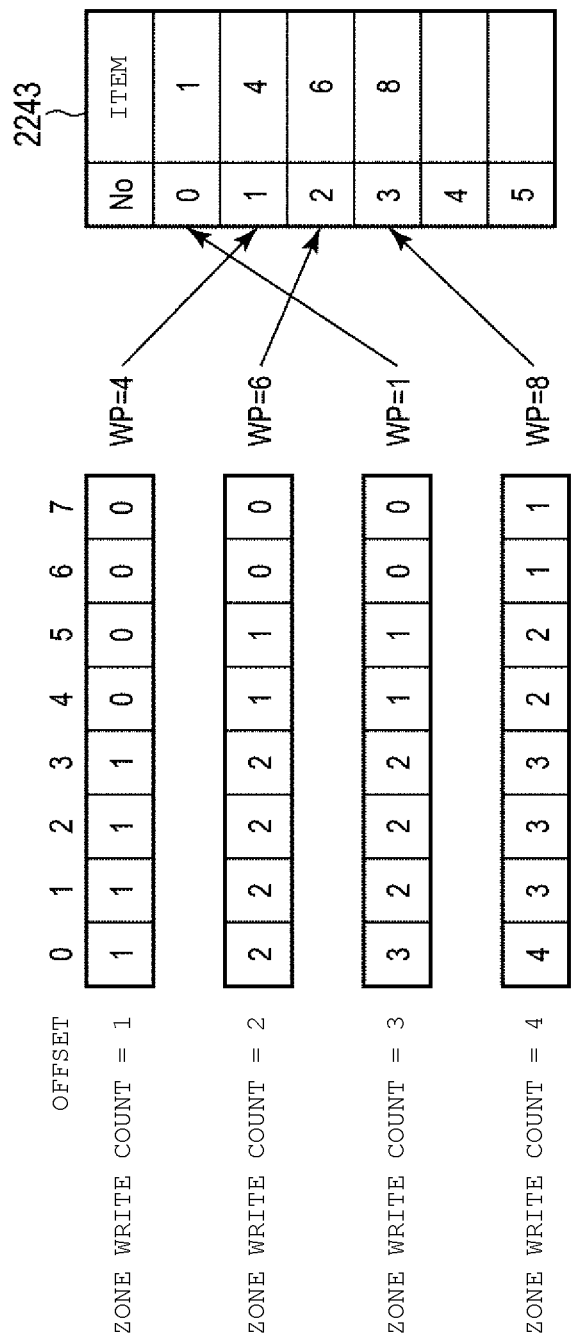
FIG. 18 is a diagram showing an example of a relationship among a zone write count, a host write pointer history, and an LBA write count managed by the information processing device according to the embodiment of the present disclosure.

Next, the host write pointer history table 2243 will be described. FIG. 18 is a diagram showing an example of the host write pointer history table according to the embodiment of the present disclosure. An entry of the host write pointer history table 2243 is added when a corresponding zone is reset or finished. In this case, the zone write count is also incremented by 1.

First, a data write operation is performed on four storage locations corresponding to four LBAs at the offsets of 0 to 3 of the corresponding zone. The number of times of writing (in other words, a write processing count) corresponding to each of the four LBAs at the offsets of 0 to 3 is set to one. A write processing count corresponding to each of the four LBAs at the offsets of 4 to 7 is 0. A write pointer WP (in other words, a host write pointer) is updated to 4. WP=4 indicates that the next writable LBA is the LBA at the offset of 4. In this case, a case where a corresponding zone is reset is assumed.

The zone write count is incremented by 1. Consequently, the zone write count is changed from 0 to 1. In the 0th entry of the host write pointer history table 2243, a value of the write pointer WP (here, 4) immediately before the zone is reset is stored as write pointer history information. The value of the write pointer WP returns to 0. The history table latest offset is incremented by 1. The write pointer history information in the host write pointer history table 2243 is rearranged in ascending order later.

Next, a data write operation is performed on six storage locations corresponding to the six LBAs at the offsets of 0 to 5 of the corresponding zone. The write processing counts corresponding to the four LBAs at the offsets of 0 to 3 are set to 2. The write processing counts corresponding to the two LBAs at the offset 4 and offset 5 are set to 1. The write processing counts corresponding to two LBAs at the offset of 6 and the offset of 7 are 0. The value of the write pointer WP is updated to 6. In this case, a case where a corresponding zone is reset is assumed.

The zone write count is incremented by 1. Consequently, the zone write count is changed from 1 to 2. In the first entry of the host write pointer history table 2243, the value of the write pointer WP (here, 6) immediately before the zone is reset is stored as the write pointer history information. The value of the write pointer WP returns to 0. The history table latest offset is incremented by 1.

A data write operation is then performed on a storage location corresponding to the LBA at the offset of 0 of the corresponding zone. The write processing count corresponding to the LBA at the offset of 0 is set to 3. The write processing counts corresponding to two LBAs at the offset of 1 and the offset of 3 are 2. The write processing counts corresponding to two LBAs at the offset of 4 and the offset of 5 are 1. The write processing counts corresponding to two LBAs at the offset of 6 and the offset of 7 are 0. The value of the write pointer WP is updated to 1. In this case, a case where a corresponding zone is reset is assumed.

The zone write count is incremented by 1. Consequently, the zone write count is changed from 2 to 3. In the third entry of the host write pointer history table 2243, the value of the write pointer WP (here, 1) immediately before the zone is reset is stored as the write pointer history information. The value of the write pointer WP returns to 0. The history table latest offset is incremented by 1.

For example, here, the write pointer history information in the host write pointer history table 2243 is rearranged so that the values stored in the entries are in ascending order. Consequently, the value indicating 1 is stored in the 0th entry of the host write pointer history table 2243, the value indicating 4 is stored in the first entry, and the value indicating 6 is stored in the second entry.

A data write operation is then performed on eight storage locations corresponding to eight LBAs at the offsets 0 to 7 of the corresponding zone. The write processing count corresponding to the LBA at the offset of 0 is set to 4. The write processing counts corresponding to the three LBAs at the offsets 1 to 3 are set to 3. The write processing counts corresponding to the two LBAs at the offset of 4 and the offset of 5 are set to 2. The write processing counts corresponding to the two LBAs at the offset of 6 and the offset of 7 are set to 1. The value of the write pointer WP is updated to 8. In this case, the total size of the data written in the corresponding zone has reached the zone capacity, so the zone write count is incremented to four. The value indicating 8 is stored in the fourth entry of the host write pointer history table 2243 as the write pointer history information.

Here, a case where the data write operation is executed up to the storage location corresponding to the LBA at the end of the zone has been described, but also when the zone is reset or finished in a state in which the data write operation is executed up to the storage location corresponding to the LBA in the middle of the zone, the value indicating 8 is stored in the fourth entry of the host write pointer history table 2243 as the write pointer history information. The zone write count is also incremented to 4.

As described above, in a case of repeatedly performing the operation in which the zone is reset in a state where the data write operation is executed up to the storage location corresponding to the LBA in the middle of the zone, the write processing count of the small LBA increases. A change point of the write processing count may be determined on the basis of the write pointer history information. Thus, the storage area in the memory 22 in which the LBA write count information table 2244 is stored can be released as necessary. This is because the LBA write count information table 2244 can be restored on the basis of the zone write count and the write pointer history information. A procedure of restoring the LBA write count information table 2244 will be described later.

Figure 19:
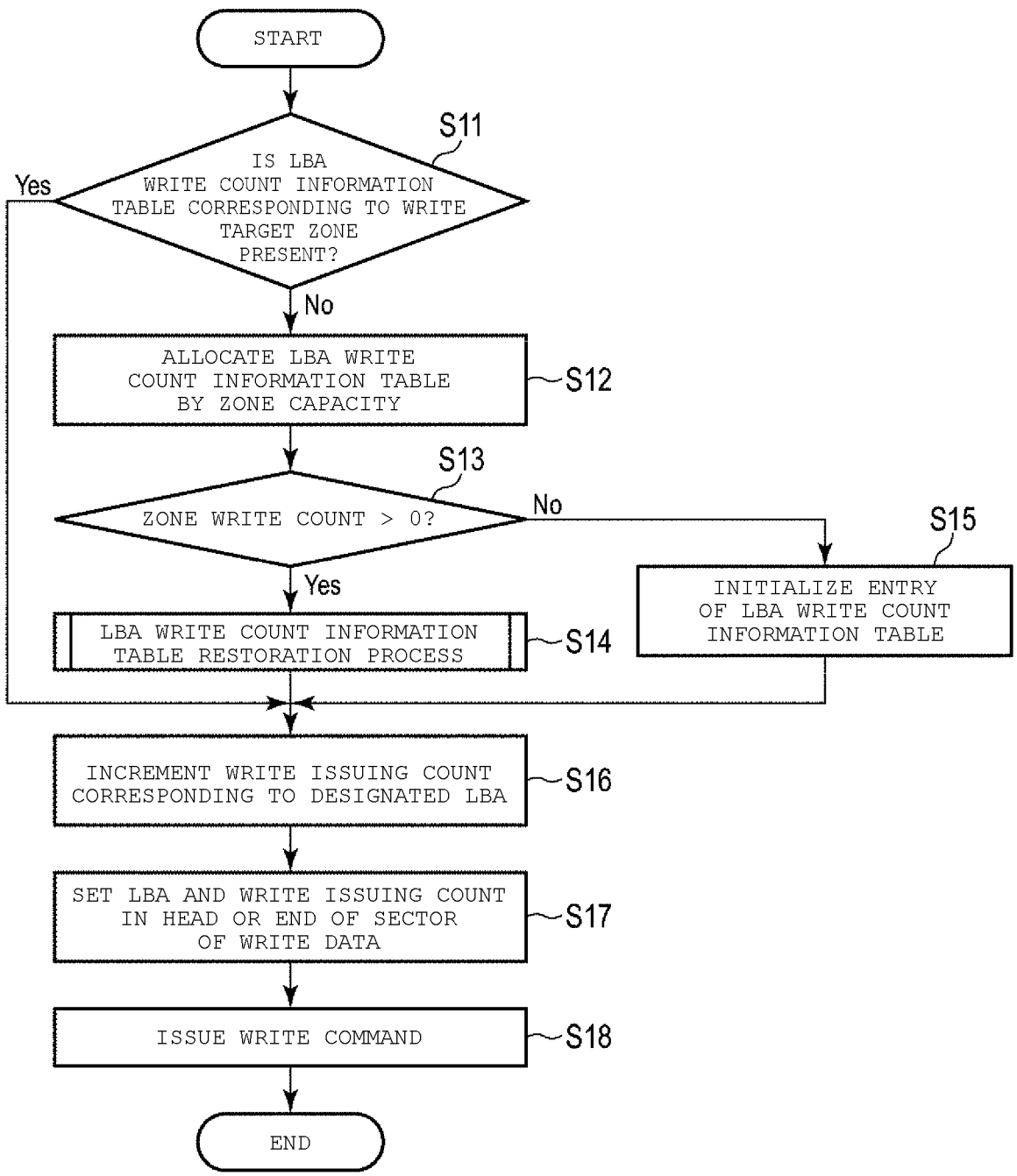
FIG. 19 is a flowchart showing a procedure of a table setting operation executed when a write command is issued in the information processing device according to the embodiment of the present disclosure.

Next, a procedure of an operation of setting the data compare management table 224 when a write command is issued will be described. FIG. 19 is a flowchart showing a procedure of a table setting operation executed when a write command is issued in the information processing device according to the embodiment of the present disclosure.

When write data is stored in the transfer data buffer 221 of the memory 22 and a write command is stored in the submission queue (in other words, start), the processor 21 determines whether the LBA write count information table 2244 corresponding to a zone including a ZSLBA designated by the write command is present in the memory 22 (S11).

When the LBA write count information table 2244 corresponding to the write target zone is not present in the memory 22 (No in S11), the processor 21 allocates a storage area used for the LBA write count information table 2244 having the number of entries corresponding to a zone capacity of the write target zone in the memory 22 (S12).

The processor 21 refers to a data compare management table entry corresponding to the write target zone and determines whether the zone write count is greater than 0 (S13).

When the zone write count is greater than 0 (Yes in S13), the processor 21 executes an LBA write count information table restoration process (S14). The LBA write count information table restoration process is a process of restoring a write count (in other words, a write processing count) of each LBA included in the write target zone on the basis of the zone write count and the write pointer history information.

When the zone write count is 0 (No in S13), the processor 21 initializes each entry of the LBA write count information table 2244 corresponding to the write target zone (S15).

After the procedure in S14 or the procedure in S15 is executed, or when the LBA write count information table 2244 corresponding to the write target zone is present in the memory 22 (Yes in S11), the processor 21 increments a write issuing count corresponding to each LBA designated by the write command by 1 (S16).

The processor 21 embeds the LBA and the write issuing count in a head or an end of each sector of the write data stored in the transfer data buffer 221 of the memory 22 (S17).

The processor 21 issues the write command to the memory system 3 by notifying the memory system 3 that the write command has been stored in the submission queue (S18). The processor 21 ends the table setting operation (in other words, end).

Figure 20:
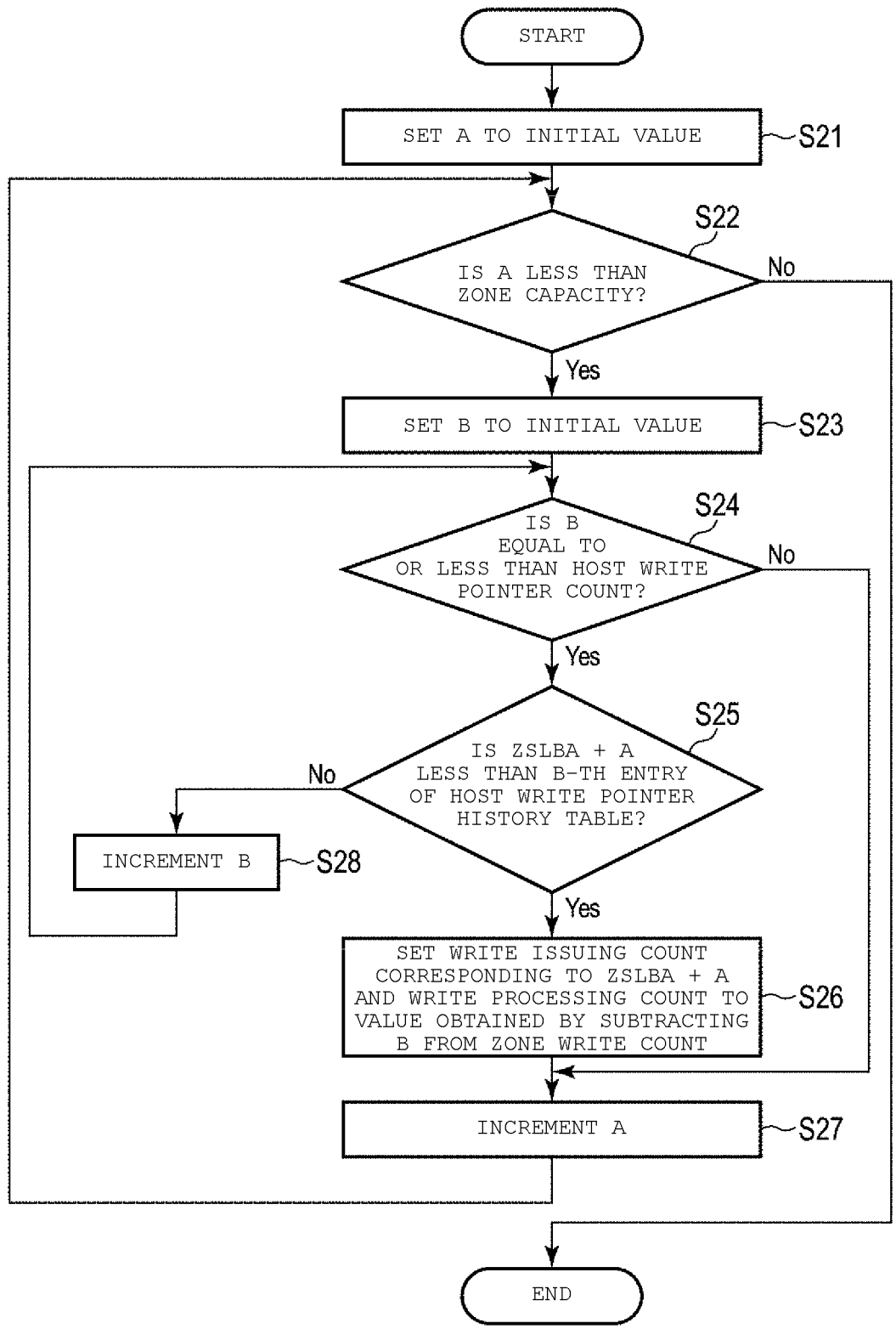
FIG. 20 is a flowchart showing a procedure of a restoration operation for the LBA write count information table executed in the information processing device according to the embodiment of the present disclosure.

Next, a procedure of the LBA write count information table restoration process executed in S14 in FIG. 19 will be described. FIG. 20 is a flowchart showing the procedure of the LBA write count information table restoration process executed in the information processing device according to the embodiment of the present disclosure.

When a zone write count of the zone corresponding to the LBA write count information table 2244 to be created is equal to or greater than 1 (in other words, start), the processor 21 sets a variable A to an initial value (here, 0) (S21).

The processor 21 determines whether A is less than a value of the zone capacity (S22).

When A is less than the value of the zone capacity (Yes in S22), the processor 21 sets a variable B to an initial value (here, 0) (S23).

The processor 21 determines whether B is equal to or less than a value of the host write pointer count (S24).

When B is equal to or less than the value of the host write pointer count (Yes in S24), the processor 21 determines whether a sum of the ZSLBA of the target zone and A is less than a value of the B-th entry of the host write pointer history table 2243 (S25). The value of the B-th entry is a value of the write pointer (in other words, a host write pointer) stored as the write pointer history information in the B-th entry.

When the sum of the ZSLBA and A is less than the value of the B-th entry (Yes in S25), the processor 21 sets the write issuing count and write processing count corresponding to the sum of the ZSLBA of the target zone and A to a value obtained by subtracting B from the zone write count corresponding to the target zone (S26).

The processor 21 increments A by 1 (S27) and executes the procedure in S22.

When the sum of the ZSLBA and A is equal to or greater than the value of the B-th entry (No in S25), the processor 21 increments B by 1 (S28) and executes the procedure in S24.

When B is greater than the value of the write pointer count (No in S24), the processor 21 increments A by 1 (S27) and executes the procedure in S22.

When A is equal to or greater than the value of the zone capacity (No in S22), the processor 21 ends the LBA write count information table restoration process (in other words, end).

Figure 21:
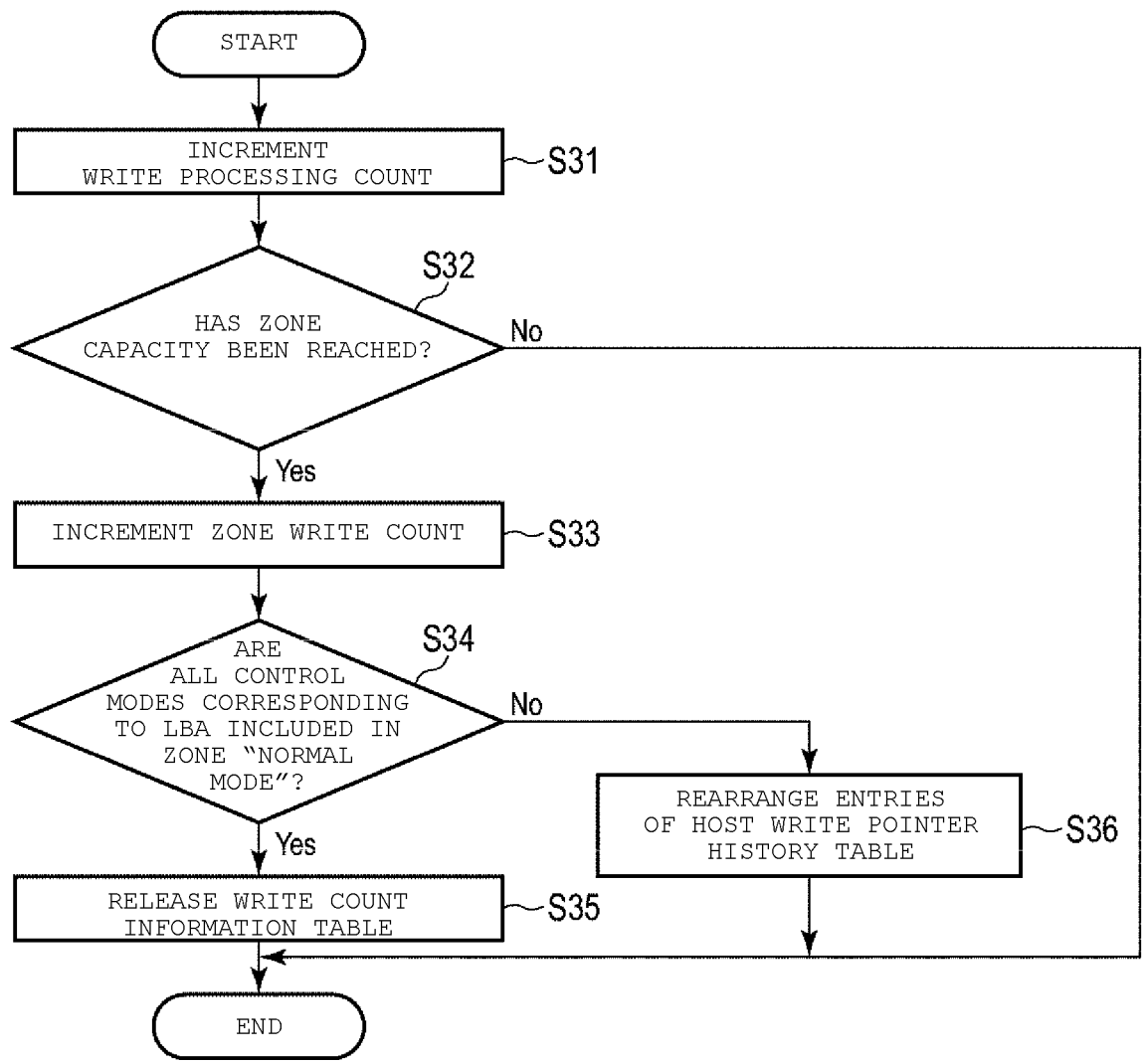
FIG. 21 is a flowchart showing a procedure of the table setting operation executed when the write command is completed in the information processing device according to the embodiment of the present disclosure.

Next, a procedure of an operation of setting the data compare management table 224 when a completion response corresponding to a write command is received will be described. FIG. 21 is a flowchart showing a procedure of a table setting operation executed when the write command is completed in the information processing device according to the embodiment of the present disclosure.

When a completion response corresponding to a write command is received (in other words, start), the processor 21 increments, by 1, each write processing count corresponding to the LBA designated by the write command corresponding to the completion response (S31).

The processor 21 determines whether a total size of data written to a zone corresponding to a zone number designated by the write command corresponding to the completion response has reached a zone capacity (S32).

When the total size of data written to the corresponding zone has reaches the zone capacity (Yes in S32), the processor 21 increments a zone write count of the corresponding zone by 1 (S33).

The processor 21 determines whether control modes corresponding to LBAs included in the corresponding zone are all set to values indicating the normal mode (S34).

When the control modes corresponding to the LBAs included in the corresponding zone are all normal modes (Yes in S34), the processor 21 releases the LBA write count information table 2244 corresponding to the corresponding zone (S35), and ends the table setting operation (in other words, end).

When a control mode corresponding to one of the LBAs included in the corresponding zone is set to a value indicating the alternative mode (No in S34), the processor 21 stores the value of the host write pointer in the host write pointer history table 2243, rearranges the values of the entries of the host write pointer history table 2243 in ascending order (S36), and ends the table setting operation (in other words, end).

When the total size of the data written in the corresponding zone has not reached the zone capacity (No in S32), the processor 21 skips the procedures in and after S33 and ends the table setting operation (in other words, end).

Figure 22:
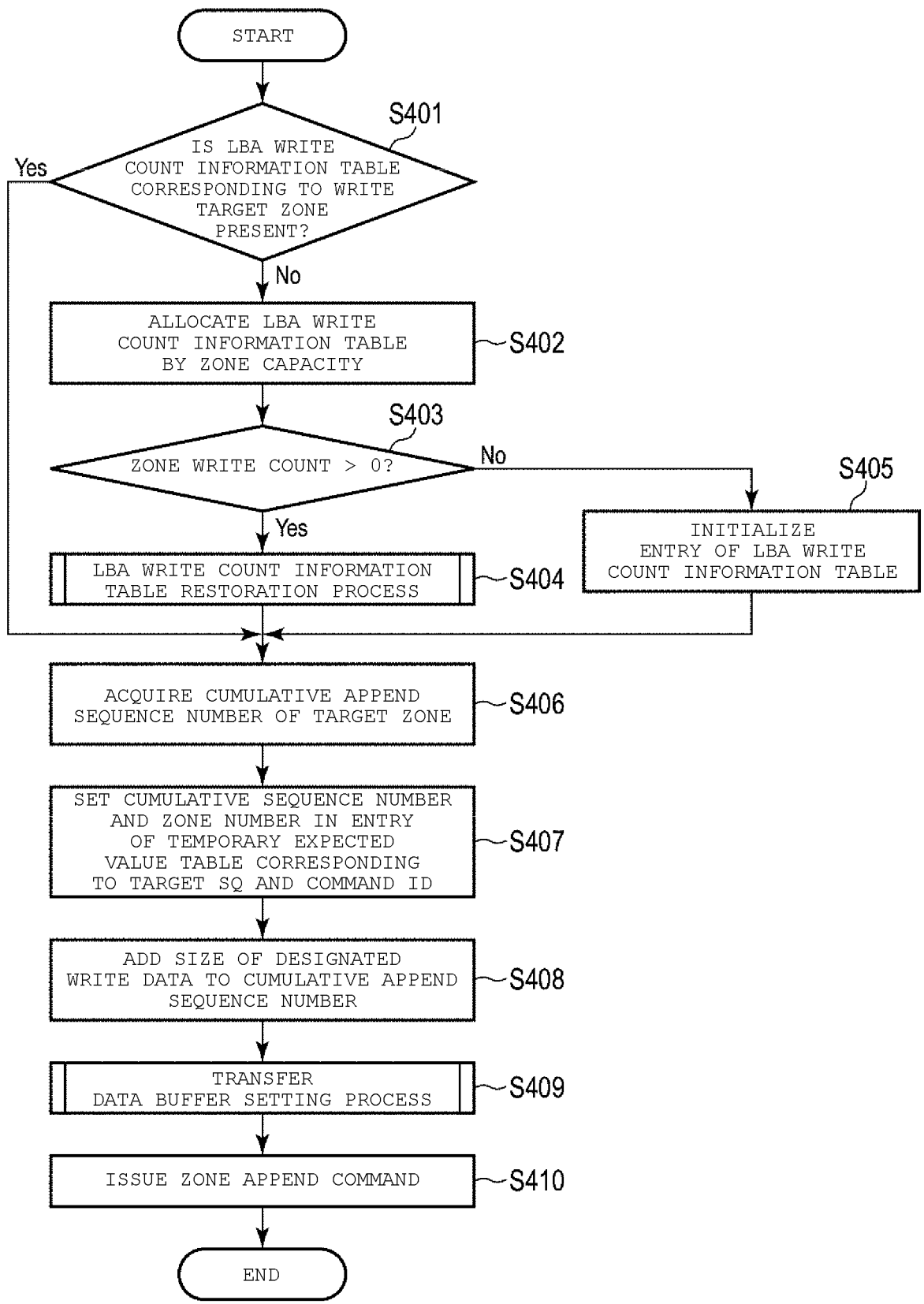
FIG. 22 is a flowchart showing a procedure of a table setting operation executed when issuing a zone append command in the information processing device according to the embodiment of the present disclosure.

Next, a procedure of an operation of setting the data compare management table 224 when a zone append command is issued will be described. FIG. 22 is a flowchart showing a procedure of a table setting operation executed when a zone append command is issued in the information processing device according to the embodiment of the present disclosure.

When write data is stored in the transfer data buffer 221 of the memory 22 and a zone append command is stored in the submission queue (in other words, start), the processor 21 determines whether the LBA write count information table 2244 corresponding to a zone including a ZSLBA designated by the zone append command is present in the memory 22 (S401).

When the LBA write count information table 2244 corresponding to the write target zone is not present in the memory 22 (No in S401), the processor 21 allocates a storage area used for the LBA write count information table 2244 having the number of entries corresponding to a zone capacity of the write target zone in the memory 22 (S402).

The processor 21 refers to a data compare management table entry corresponding to the write target zone and determines whether the zone write count is greater than 0 (S403).

When the zone write count is greater than 0 (Yes in S403), the processor 21 executes an LBA write count information table restoration process (S404).

When the zone write count is 0 (No in S403), the processor 21 initializes each entry of the LBA write count information table 2244 corresponding to the write target zone (S405).

After the procedure in S404 or the procedure S405 is executed, or when the LBA write count information table 2244 corresponding to the write target zone is present in the memory 22 (Yes in S401), the processor 21 acquires a cumulative append sequence number from a data compare management table entry corresponding to the write target zone (S406).

The processor 21 sets the cumulative append sequence number acquired in S406 as an append sequence number in an entry of temporary expected value table 2242 corresponding to a submission queue ID (also referred to as an SQID) corresponding to the submission queue storing the zone append command and a command ID (CID) corresponding to a slot of the submission queue storing the zone append command, and further sets a zone number designated by the zone append command (S407).

The processor 21 adds a size of the write data designated by the zone append command to the cumulative append sequence number stored in the data compare management table entry corresponding to the write target zone (S408).

The processor 21 executes a transfer data buffer setting process (S409).

The processor 21 issues the zone append command to the memory system 3 by notifying the memory system 3 that the zone append command has been stored in the submission queue (S410). The processor 21 ends the table setting operation (in other words, end).

Figure 23:
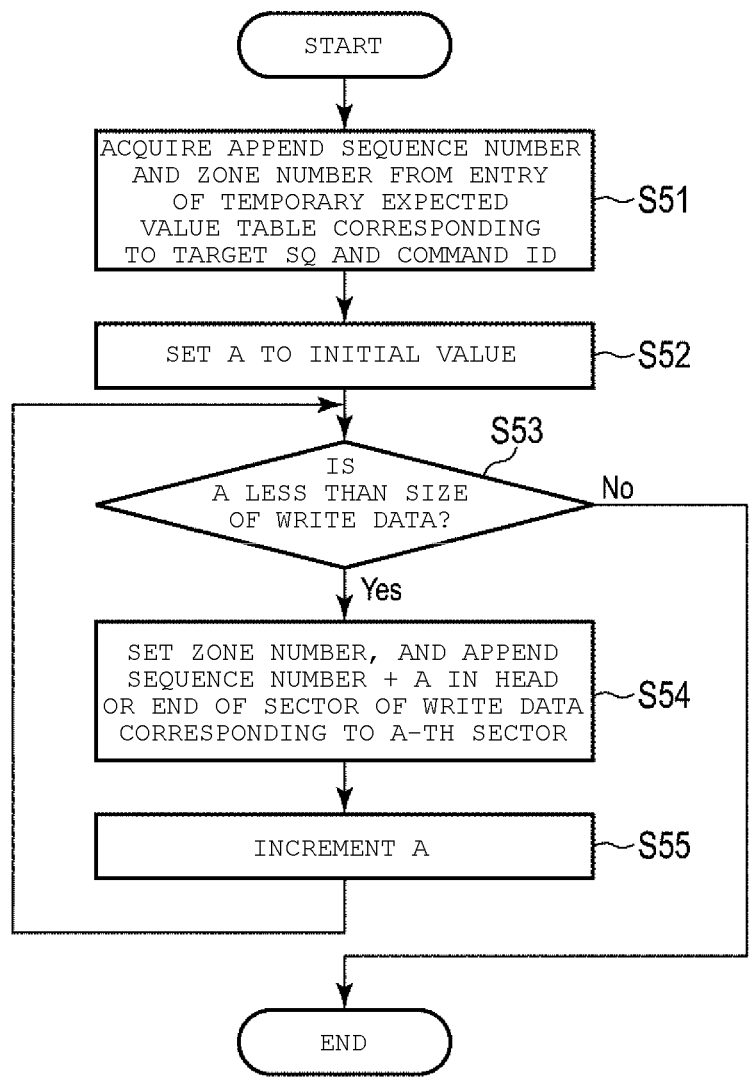
FIG. 23 is a flowchart showing a procedure of an operation of embedding a zone number and an append sequence number in a sector of write data, which is executed by the information processing device according to the embodiment of the present disclosure.

Next, a procedure of the transfer data buffer setting operation executed in the procedure in S409 in FIG. 22 will be described. FIG. 23 is a flowchart showing a procedure of an operation of embedding a zone number and an append sequence number in a sector of write data, which is executed by the information processing device according to the embodiment of the present disclosure.

When the procedure of adding the size of the write data designated by a zone append command to the cumulative append sequence number stored in the data compare management table entry corresponding to the write target zone (S408 in FIG. 22) is completed (in other words, start), the processor 21 acquires the append sequence number and the zone number from the entry of the temporary expected value table 2242 corresponding to the SQID and the CID corresponding to the zone append command (S51).

The processor 21 sets the variable A to an initial value (here, 0) (S52).

The processor 21 determines whether A is less than the size of the write data associated with the zone append command (S53).

When A is less than the size of the write data (Yes in S53), the processor 21 sets the zone number and the sum of the append sequence number and A in a head or an end of a sector of the write data corresponding to an A-th sector in the write data stored in the transfer data buffer 221 (S54).

The processor 21 increments A by 1 (S55) and determines whether A is less than the size of the write data associated with the zone append command (S53).

When A is equal to or more than the size of the write data (No in S53), the processor 21 ends the process (in other words, end).

Figure 24:
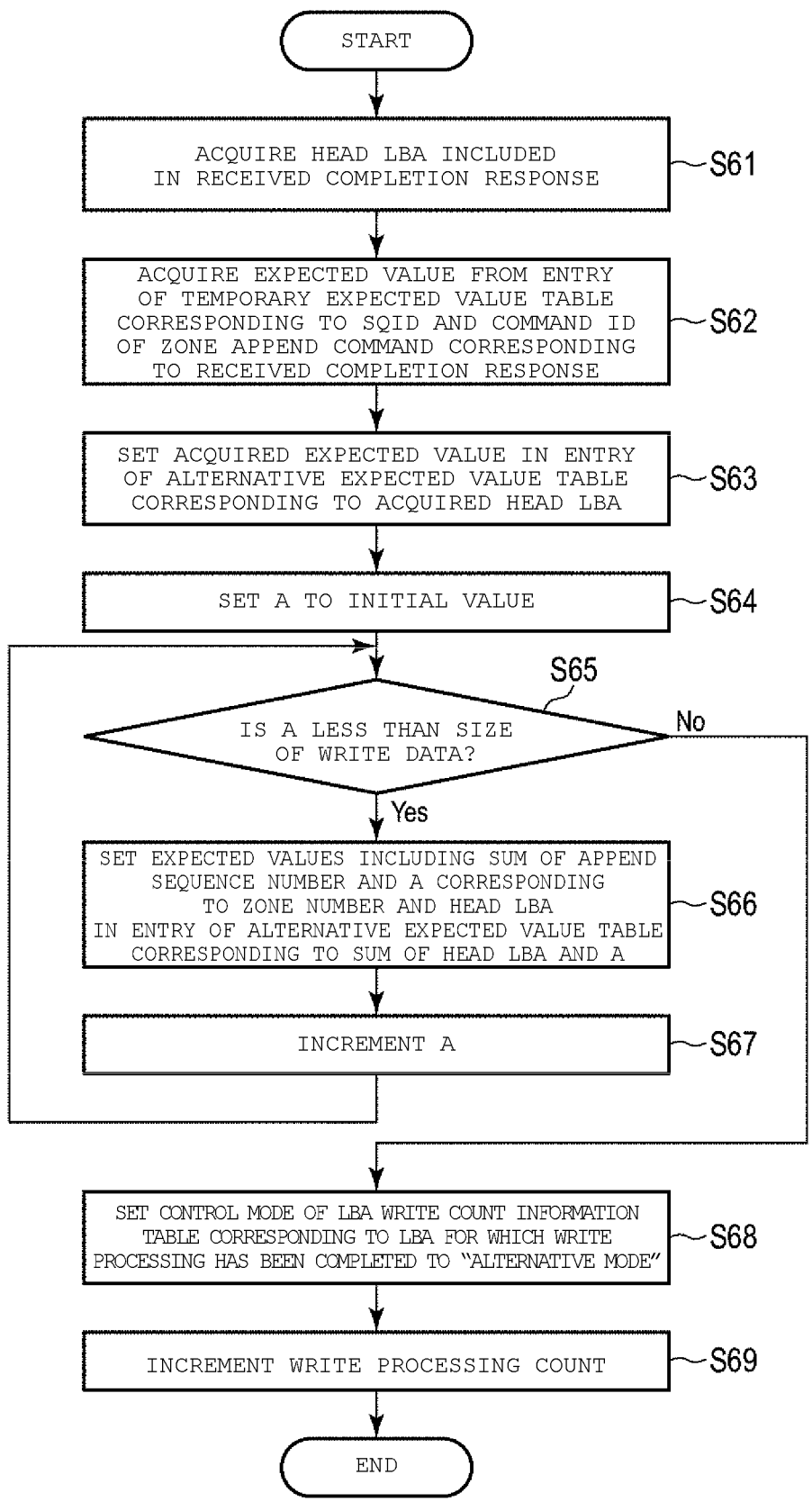
FIG. 24 is a flowchart showing a procedure of a table setting operation executed when the zone append command is completed in the information processing device according to the embodiment of the present disclosure.

Next, a procedure of an operation of setting the data compare management table 224 when a completion response corresponding to a zone append command is received will be described. FIG. 24 is a flowchart showing a procedure of a table setting operation executed when the zone append command is completed in the information processing device according to the embodiment of the present disclosure.

When a completion response corresponding to a zone append command is received (in other words, start), the processor 21 acquires information indicating the head LBA to which the write data is written, included in the received completion response (S61).

The processor 21 acquires expected values including the zone number and the append sequence number from the entry of the temporary expected value table 2242 corresponding to the SQID and the CID corresponding to the zone append command corresponding to the received completion response (S62).

The processor 21 sets the expected values acquired in S62 in the entry of the alternative expected value table 2245 corresponding to the head LBA acquired in S61 (S63).

The processor 21 sets the variable A to an initial value (here, 1) (S64).

The processor 21 determines whether A is less than the size of the write data associated with the zone append command (S65).

When A is less than the size of the write data (Yes in S65), the processor 21 sets expected values including the zone number and a sum of the append sequence number corresponding to the head LBA and A in the entry of the alternative expected value table 2245 corresponding to a sum of the head LBA acquired in S61 and A (S66).

The processor 21 increments A by 1 (S67).

When A is equal to or more than the size of the write data (No in S65), the processor 21 sets a control mode in the LBA write count information table 2244 corresponding to the LBA corresponding to the storage location on which the data write operation has been performed to a value indicating the alternative mode (S68).

The processor 21 increments, by 1, the write processing count in the LBA write count information table 2244 corresponding to the LBA on which the data write operation has been performed (S69). The processor 21 ends the table setting operation (in other words, end).

Figure 25:
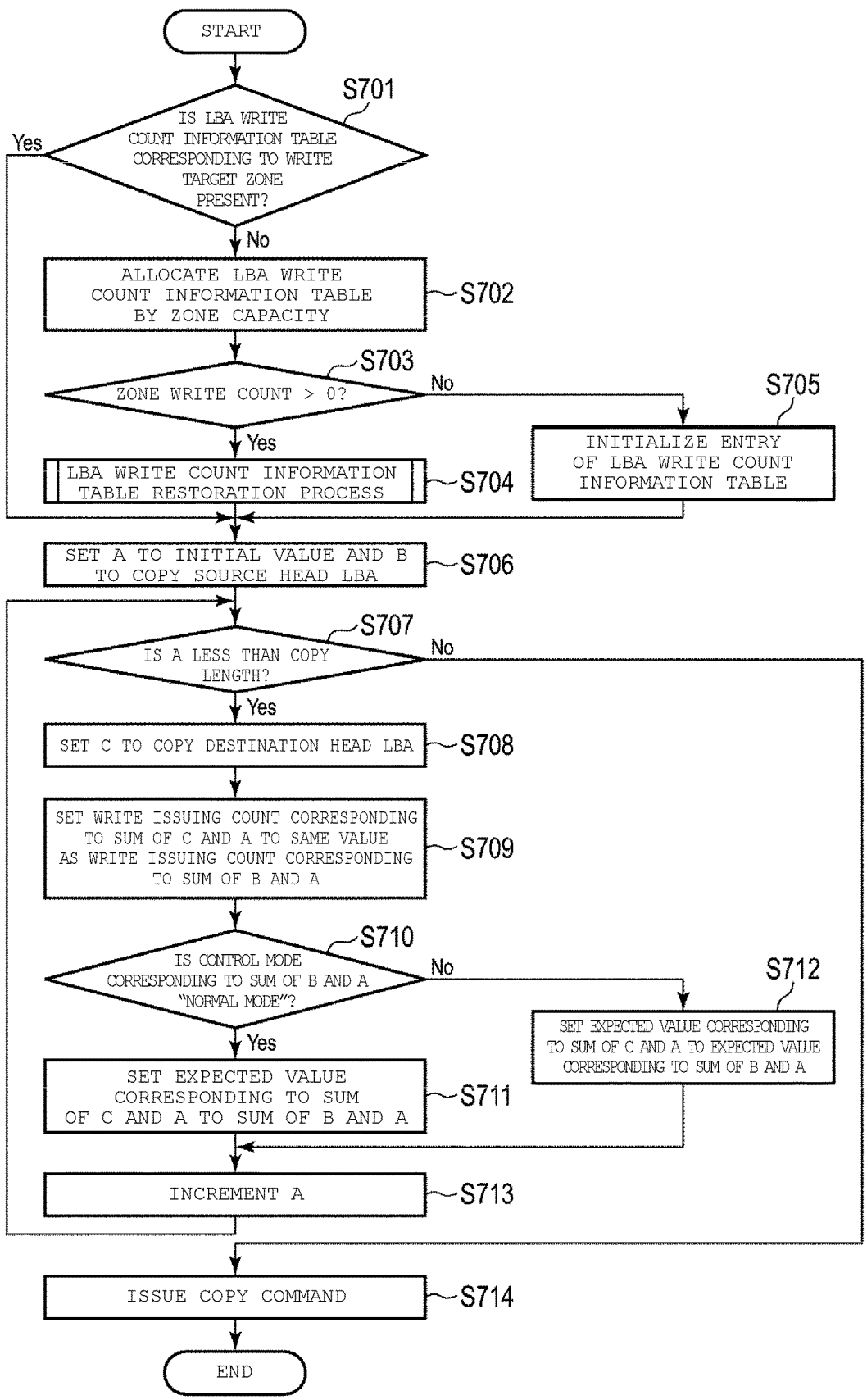
FIG. 25 is a flowchart showing a procedure of a table setting operation executed when the copy command is issued in the information processing device according to the embodiment of the present disclosure.

Next, a procedure of an operation of setting the data compare management table 224 when a copy command is issued will be described. FIG. 25 is a flowchart showing a procedure of a table setting operation executed when a copy command is issued in the information processing device according to the embodiment of the present disclosure.

When a copy command is stored in the submission queue (in other words, start), the processor 21 determines whether the LBA write count information table 2244 corresponding to a zone including an LBA designated by the copy command as a copy destination address is present in the memory 22 (S701).

When the LBA write count information table 2244 corresponding to the write target zone is not present in the memory 22 (No in S701), the processor 21 allocates a storage area used for the LBA write count information table 2244 having the number of entries corresponding to a zone capacity of the write target zone in the memory 22 (S702).

The processor 21 refers to a data compare management table entry corresponding to the write target zone and determines whether the zone write count is greater than 0 (S703).

When the zone write count is greater than 0 (Yes in S703), the processor 21 executes an LBA write count information table restoration process (S704).

When the zone write count is 0 (No in S703), the processor 21 initializes the entry of the LBA write count information table 2244 corresponding to the write target zone (S705).

After the procedure in S704 or the procedure in S705 is executed, or when the LBA write count information table 2244 corresponding to the write target zone is present in the memory 22 (Yes in S701), the processor 21 sets the variable A to an initial value (here, 0), and sets the variable B to a value indicating a head LBA in the copy source address (S706).

The processor 21 determines whether A is less than a data size (in other words, a copy length) designated by the copy command (S707).

When A is less than the copy length (S707 Yes), the processor 21 sets a variable C to a value indicating the head LBA in the copy destination address designated by the copy command (S708).

The processor 21 sets the write issuing count corresponding to the LBA indicated by a sum of C and A to the same value as the write issuing count corresponding to the LBA indicated by the sum of B and A (S709).

The processor 21 determines whether a control mode corresponding to the LBA indicated by the sum of B and A is the normal mode (S710).

When the control mode corresponding to the LBA indicated by the sum of B and A is the normal mode (Yes in S710), the processor 21 sets the sum of B and A as an expected value in the entry of the alternative expected value table 2245 corresponding to the LBA indicated by the sum of C and A (S711).

When the control mode corresponding to the LBA indicated by the sum of B and A is the alternative mode (No in S710), the processor 21 sets the expected value stored in the entry of the alternative expected value table 2245 corresponding to the LBA indicated by the sum of C and A in the entry of the alternative expected value table 2245 corresponding to the LBA indicated by the sum of B and A (S712). In this case, the processor 21 executes a process of reading an expected value from the entry of the alternative expected value table 2245 corresponding to the LBA indicated by the sum of B and A, and a process of storing the read expected value in the entry of the alternative expected value table 2245 corresponding to the LBA indicated by the sum of C and A.

The processor 21 increments A by 1 (S713) and determines whether A is less than the copy length (S707).

When A is equal to or more than the copy length (No in S707), the processor 21 issues the copy command to the memory system 3 by notifying the memory system 3 that the copy command has been stored in the submission queue (S714). The processor 21 ends the table setting operation (in other words, end).

Figure 26:
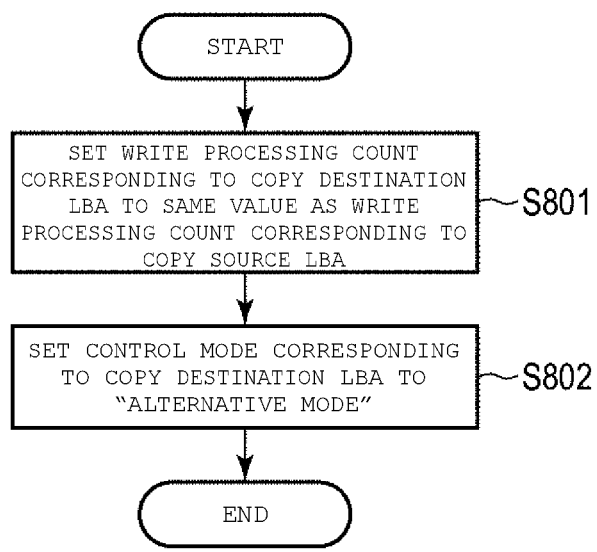
FIG. 26 is a flowchart showing a procedure of a table setting operation executed when the copy command is completed in the information processing device according to the embodiment of the present disclosure.

Next, a procedure of an operation of setting the data compare management table 224 when a completion response corresponding to a copy command is received will be described. FIG. 26 is a flowchart showing a procedure of a table setting operation executed when the copy command is completed in the information processing device according to the embodiment of the present disclosure.

When a completion response corresponding to a copy command is received (in other words, start), the processor 21 sets a write processing count corresponding to an LBA included in a copy destination address designated by the copy command corresponding to the received completion response to the same value as a write processing count corresponding to an LBA included in a copy source address (S801).

The processor 21 sets a control mode corresponding to the LBA included in the copy destination address to a value indicating the alternative mode (S802).

The processor 21 ends control of the data compare management table 224 (in other words, end).

Figure 27:
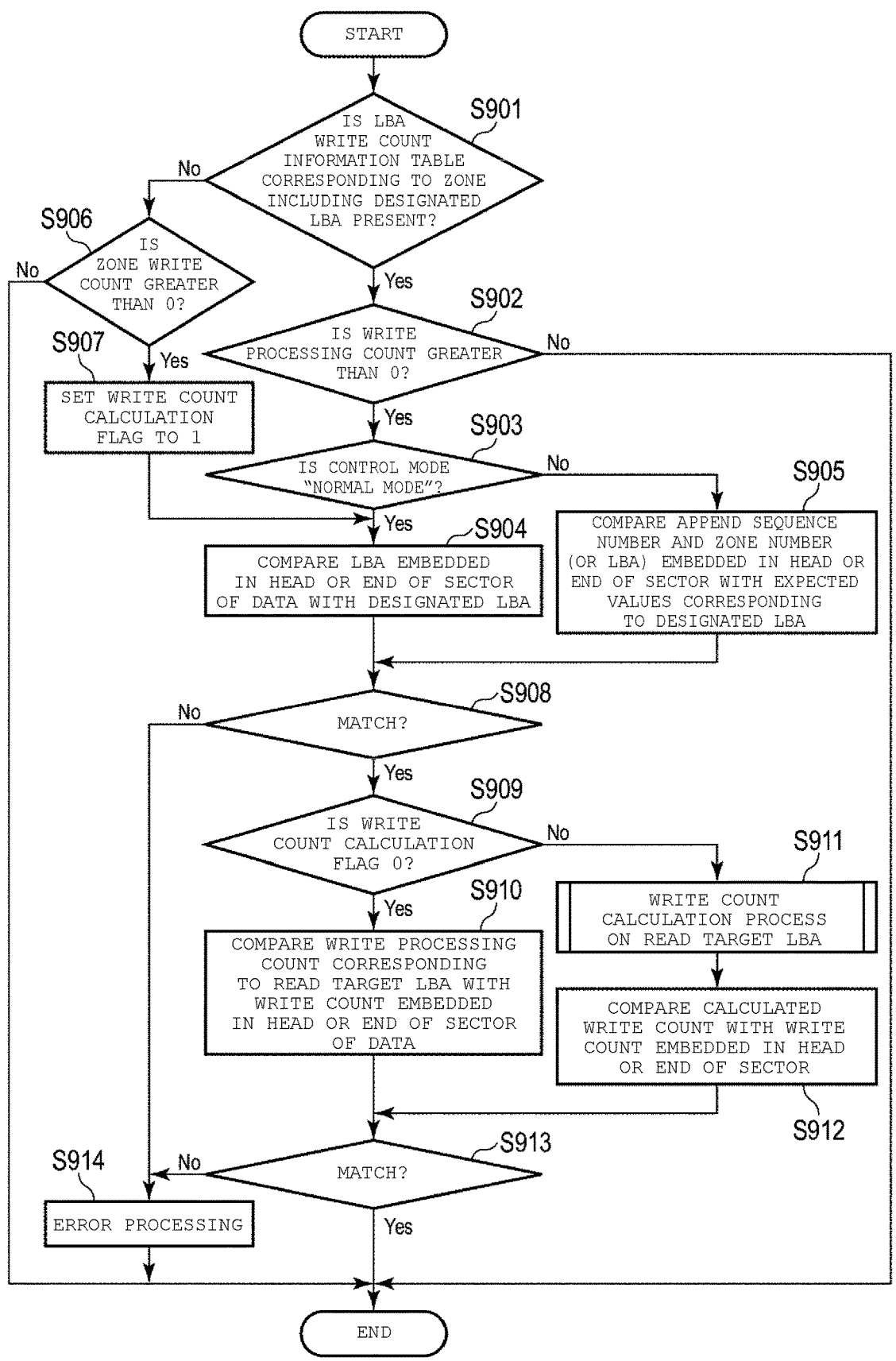
FIG. 27 is a flowchart showing a procedure of a data compare operation executed when a read command is completed in the information processing device according to the embodiment of the present disclosure.

Next, a procedure of a data compare operation will be described. FIG. 27 is a flowchart showing a procedure of a data compare operation executed when the read command is completed in the information processing device according to the embodiment of the present disclosure.

When a completion response corresponding to a read command is received (in other words, start), the processor 21 determines whether the LBA write count information table 2244 corresponding to a zone including an LBA designated by the read command corresponding to the received completion response is present in the memory 22 (S901).

When the LBA write count information table 2244 is present in the memory 22 (Yes in S901), the processor 21 determines whether a write processing count corresponding to the read target LBA is greater than 0 (S902).

When the write processing count is 0 (No in S902), the processor 21 ends the compare operation (in other words, end).

When the write processing count is greater than 0 (S902 Yes), the processor 21 determines whether a control mode corresponding to the read target LBA is the normal mode (S903).

When the control mode is the normal mode (Yes in S903), the processor 21 compares the LBA embedded in the head or the end of the sector of the read data with the LBA designated by the read command (S904).

When the control mode is the alternative mode (No in S903), the processor 21 compares the append sequence number and the zone number (or the LBA) embedded in the head or the end of the sector with expected values stored in the entry of the alternative expected value table 2245 corresponding to the LBA designated by the read command (S905).

When the LBA write count information table 2244 is not present in the memory 22 (No in S901), the processor 21 determines whether a zone write count corresponding to a zone including the LBA designated by the read command is greater than 0 (S906).

When the zone write count is greater than 0 (Yes in S906), the processor 21 sets a write count calculation flag to 1 (S907). The write count calculation flag is a value indicating that the LBA write count information table restoration process is to be executed on the basis of the host write pointer history table 2243. The processor 21 compares the LBA embedded in the head or the end of the sector of the read data with the LBA designated by the read command (S904).

When the zone write count is 0 (No in S906), the processor 21 ends the compare operation (in other words, end).

After the procedure in S904 or the procedure in S905 is completed, the processor 21 determines whether the information compared in S904 or S905 matches (S908).

When the compared information matches (S908 Yes), the processor 21 determines whether the write calculation flag is 0 (S909).

When the write calculation flag is 0 (Yes in S909), the processor 21 compares the write processing count stored in the entry of the LBA write count information table 2244 corresponding to the read target LBA with the write count embedded in the head or the end of the sector of the read data (S910).

When the write calculation flag is 1 (No in S909), the processor 21 executes a write count calculation process corresponding to the read target LBA (S911).

The processor 21 compares the write count calculated in S911 with the write count embedded in the head or the end of the sector of the read data (S912).

When the procedure in S910 or S912 is completed, the processor 21 determines whether the write counts compared in S910 or S912 match (S913).

When the compared write counts match (S913 Yes), the processor 21 determines that the read data has been read normally, and ends the compare operation (in other words, end).

When the compared information does not match (No in S908) or the compared write counts do not match (No in S913), the processor 21 executes error processing (S914) and ends the data compare operation (in other words, end).

When the read data is data written on the basis of the zone append command or data copied from the data written on the basis of the zone append command, the processor 21 skips the procedures from S909 to S913.

Figure 28:
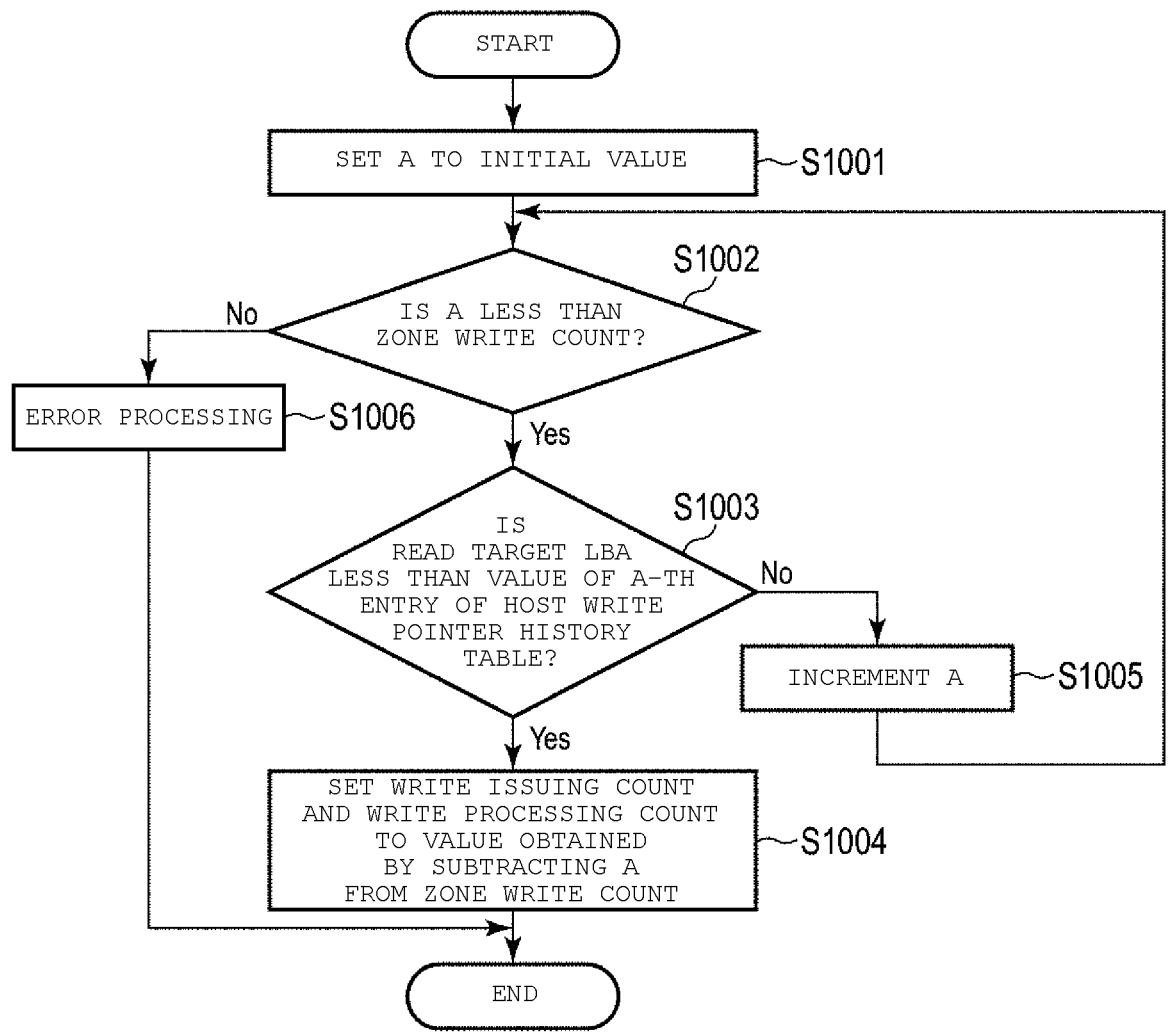
FIG. 28 is a flowchart showing a procedure of a write count calculation operation executed in the information processing device according to the embodiment of the present disclosure.

Next, the write count calculation operation will be described. FIG. 28 is a flowchart showing a procedure of a write count calculation operation executed in the information processing device according to the embodiment of the present disclosure.

When determining that the write count calculation flag is 1 (in other words, start), the processor 21 sets the variable A to an initial value (here, 0) (S1001).

The processor 21 determines whether A is less than a zone write count corresponding to a read target zone (S1002).

When A is less than the zone write count (Yes in S1002), the processor 21 determines whether the read target LBA is less than a value stored in an A-th entry of the host write pointer history table 2243 (S1003).

When the read target LBA is less than the value of the A-th entry (Yes in S1003), the processor 21 sets the write issuing count and the write processing count corresponding to the read target LBA to a value obtained by subtracting A from the zone write count (S1004), and ends the write count calculation operation (in other words, end).

When the read target LBA is equal to or greater than the value of the A-th entry (No in S1003), the processor 21 increments A by 1 (S1005) and determines whether A is less than the zone write count (S1002).

When A is equal to or greater than the zone write count (No in S1002), the processor 21 executes error processing (S1006) and ends the write count calculation operation (in other words, end).

Figure 29:
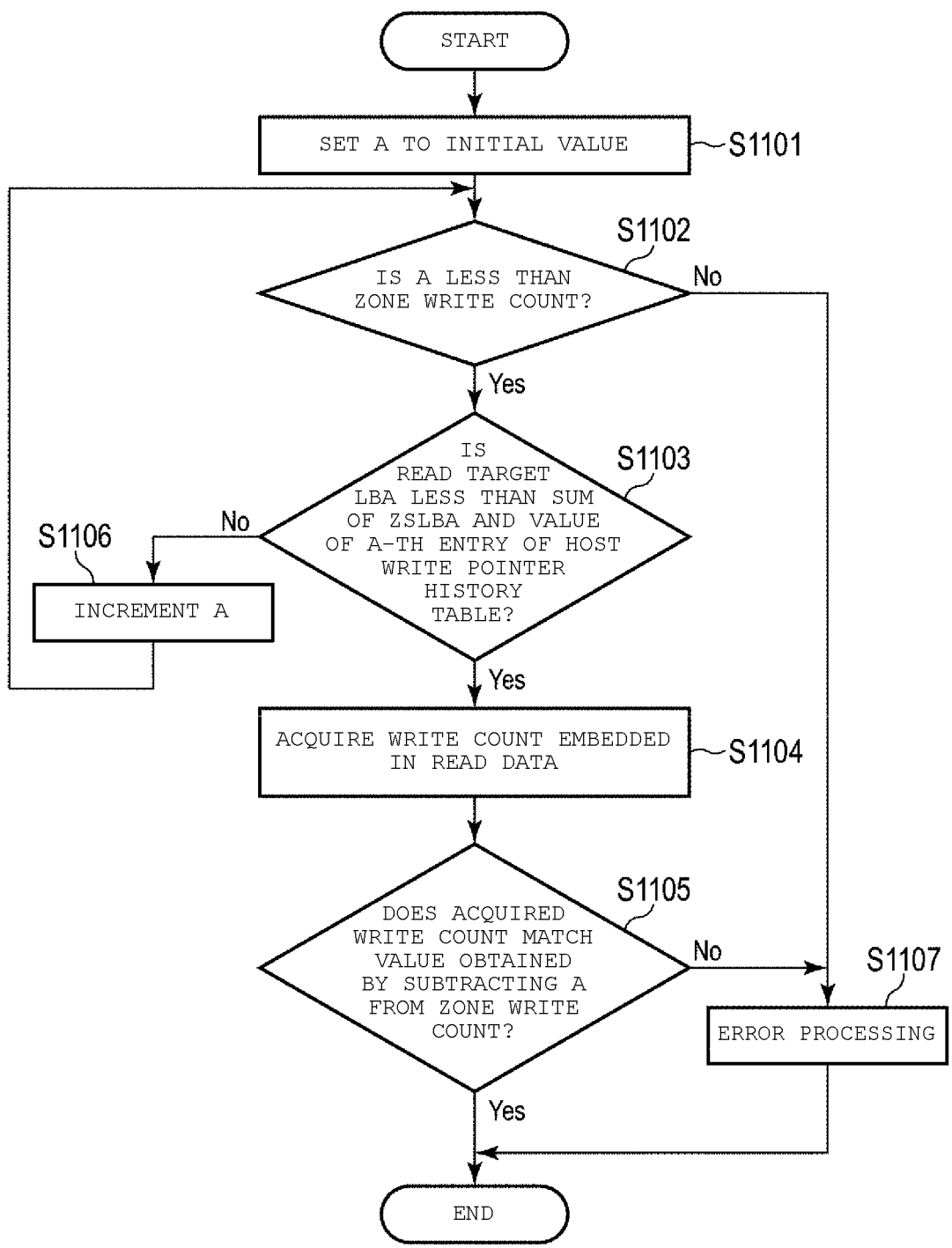
FIG. 29 is a flowchart showing a procedure of a write count compare operation using a host write pointer history table, executed in the information processing device according to the embodiment of the present disclosure.

Next, a procedure of a compare operation that may be executed instead of the procedures from S911 to S914 in FIG. 27 will be described. FIG. 29 is a flowchart showing a procedure of a write count compare operation using the host write pointer history table, executed in the information processing device according to the embodiment of the present disclosure.

When it is determined that the write count calculation flag is 1 (in other words, start), the processor 21 sets the variable A to an initial value (here, 0) (S1101).

The processor 21 determines whether A is less than the zone write count corresponding to the zone including the read target LBA (S1102).

When A is less than the zone write count (S1102 Yes), the processor 21 determines whether the read target LBA is less than a sum of the ZSLBA and the value stored in the A-th entry of the host write pointer history table 2243 (S1103).

When the read target LBA is less than the sum of the ZSLBA and the value stored in the A-th entry (Yes in S1103), the processor 21 acquires the write count embedded in the read data (S1104).

The processor 21 determines whether the write count acquired in S1104 matches a value obtained by subtracting A from the zone write count (S1105).

When the acquired write count matches the value obtained by subtracting A from the zone write count (Yes in S1105), the processor 21 determines that the read data has been read normally, and ends the compare operation (in other words, end).

When the LBA is equal to or more than the sum of the ZSLBA and the value stored in the A-th entry (No in S1103), the processor 21 increments A by 1 (S1106), and determines whether A is less than the zone write count (S1102).

When A is equal to or greater than the zone write count (No in S1102), or when the acquired write count does not match the value obtained by subtracting A from the zone write count (No in S1105), the processor 21 executes a error processing (S1107), and ends the compare operation (in other words, end).

As described above, according to the embodiment of the present disclosure, a zone identifier that is an identifier for uniquely identifying a zone and a sequence number that is a unique number for each LBA of the zone are embedded in a head or an end of a sector of data to be written to the zone on the basis of a zone append command. The zone identifier and the sequence number are then stored as first expected values that are expected values used to evaluate the data integrity of read data that is read from a storage location indicated by an LBA subjected to writing on the basis of the zone append command. Therefore, it can be determined whether the same data as the data written to the zone on the basis of the zone append command can be correctly read from the memory system.

The processor 21 can check a control mode corresponding to this read data by referring to an entry of the LBA write count information table 2244 corresponding to the LBA associated with the read data.

In a data compare operation for read data for which a write operation has been performed in a normal control mode, a read target LBA is compared with the LBA embedded in the read data. A write processing count corresponding to the read target LBA is compared with a write count embedded in the read data.

In a data compare operation for read data for which a write operation has been executed in an alternative control mode, the expected values stored in the entry of the alternative expected value table 2245 corresponding to the read target LBA are compared with the zone number and the append sequence number embedded in the read data.

The processor 21 can execute a process of restoring the LBA write count information table 2244 on the basis of a value of the host write pointer stored in the entry of the host write pointer history table 2243 and a zone write count by using the fact that a data write operation to a zone is executed in order from the smallest LBA.

When a command similar to the zone append command or the copy command is defined in the Zoned Block Command or the Zoned Device ATA Command Set, the configuration of the present embodiment is also applicable to a case of writing data to a zone by using commands defined in the Zoned Block Command or the Zoned Device ATA Command Set.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing device comprising:
a processor configured to execute a test operation related to evaluation of data integrity of data written in a memory system; and
a memory, wherein
the processor is configured to
  store, in the memory, first write data to be written to a storage area of the memory system,
  embed a zone identifier for uniquely identifying a zone including a plurality of consecutive logical addresses, and a sequence number for each logical address in a head or an end of a sector of the first write data stored in the memory,
  issue, to the memory system, a zone append command for designating a head logical address of the zone and a size of the first write data, instead of designating a logical address corresponding to a storage location of the storage area to which the first write data is written, and requesting writing of the first write data to the storage area corresponding to the zone,
  acquire, after a completion response corresponding to the zone append command is received, a first logical address corresponding to the storage location to which the first write data is written, and
  store the zone identifier and the sequence number in a first expected value table storing expected values of read data corresponding to the zone for each logical address as first expected values to be used to evaluate data integrity of read data that is read from the storage location corresponding to the first logical address.

2. The information processing device according to claim 1, wherein the processor is further configured to
  issue, to the memory system, a first read command for designating the first logical address and requesting reading of data from the storage location corresponding to the first logical address, and
  when first read data based on the first read command is received, compare information included in a head or an end of a sector of the first read data with the first expected values stored in the first expected value table.

3. The information processing device according to claim 1, wherein
the processor is further configured to
  manage a cumulative sequence number obtained by accumulating a size of write data designated by the zone append command each time the zone append command for designating the head logical address of the zone is issued, and
  generate the sequence number to be embedded in the head or the end of the sector of the first write data based on the cumulative sequence number.

4. The information processing device according to claim 1, wherein
the processor is further configured to
  manage a zone write count indicating a number of times of writing for the entire storage area corresponding to the zone,
  each time the zone is reset to a free state, store a write pointer indicating a next writable logical address in the zone in a write pointer history table storing history information of a write pointer of the zone as write pointer history information, and
  when a first write count information table storing write count information indicating a number of times of writing for a storage location corresponding to each of the plurality of logical addresses of the zone is not present in the memory, restore the write count information based on the zone write count and the write pointer history information.

5. The information processing device according to claim 4, wherein
the write count information includes a write issuing count indicating a number of times a command for writing data has been issued for each logical address, and a write processing count indicating a number of times writing has been completed for each logical address, and
the processor is further configured to
  store, in the memory, second write data to be written to a storage location corresponding to a third logical address among the plurality of logical addresses,
  increment, by one, a third write issuing count corresponding to the third logical address, stored in the first write count information table,
  embed the third logical address and the incremented third write issuing count in a head or an end of a sector of the second write data stored in the memory,
  issue, to the memory system, a write command for designating the third logical address and a size of the second write data and requesting writing of the second write data to the storage location corresponding to the third logical address, and
  increment, by one, a third write processing count corresponding to the third logical address, stored in the first write count information table when a response indicating completion of processing of the write command is received.

6. The information processing device according to claim 5, wherein the processor is further configured to
  issue, to the memory system, a second read command for designating the third logical address and requesting reading of data from the storage location corresponding to the third logical address, and
  when second read data based on the second read command is received, compare a logical address and a write count included in a head or an end of a sector of the second read data with the third logical address and the third write processing count of the first write count information table, respectively.

7. The information processing device according to claim 5, wherein
the processor is further configured to
  when a second copy command for designating the third logical address as a copy source logical address, designating a fourth logical address as a copy destination logical address, and requesting copying of data written in a storage location corresponding to the copy source logical address to a storage location corresponding to the copy destination logical address is issued to the memory system, execute an operation of storing the third logical address in a third expected value table storing expected values of read data corresponding to a copy destination zone including the copy destination logical address for each logical address of the copy destination zone as a third expected value used to evaluate data integrity of read data that is read from a storage location corresponding to the fourth logical address, and an operation of storing the third write issuing count to be stored in the first write count information table in a second write count information table storing write count information indicating a number of times of writing for each logical address included in the copy destination zone as a write issuing count corresponding to the fourth logical address, and set a write processing count corresponding to the fourth logical address to the same value as a write processing count corresponding to the third logical address when a response indicating completion of the second copy command is received.

8. The information processing device according to claim 1, wherein the processor is further configured to, when a first copy command for designating the first logical address as a copy source logical address, designating a second logical address as a copy destination logical address, and requesting copying of data written in a storage location corresponding to the copy source logical address to a storage location corresponding to the copy destination logical address, is issued to the memory system, store the zone identifier and the sequence number in a second expected value table storing expected values of read data corresponding to a copy destination zone including the copy destination logical address as second expected values to be used to evaluate data integrity of read data read from a storage location corresponding to the second logical address.

9. A test method of executing a test operation related to evaluation of data integrity of data written in a memory system, comprising:

storing, in a memory, first write data to be written to a storage area of the memory system corresponding to a zone including a plurality of consecutive logical addresses;

embedding a zone identifier for uniquely identifying the zone, and a sequence number for each logical address in a head or an end of a sector of the first write data stored in the memory;

issuing, to the memory system, a zone append command for designating a head logical address of the zone and a size of the first write data, instead of designating a logical address corresponding to a storage location of the storage area to which the first write data is written, and requesting writing of the first write data to the storage area corresponding to the zone;

acquiring, after a completion response corresponding to the zone append command is received, a first logical address corresponding to the storage location to which the first write data is written; and storing the zone identifier and the sequence number in a first expected value table storing expected values of read data corresponding to the zone for each logical address as first expected values that are expected values used to evaluate data integrity of read data that is read from the storage location corresponding to the first logical address.

10. The test method according to claim 9, further comprising:

issuing, to the memory system, a first read command for designating the first logical address and requesting reading of data from the storage location corresponding to the first logical address; and when first read data based on the first read command is received, comparing information included in a head or an end of a sector of the first read data with the first expected values stored in the first expected value table.

11. The test method according to claim 9, further comprising:

managing a cumulative sequence number obtained by accumulating a size of write data designated by the zone append command each time the zone append command for designating the head logical address of the zone is issued; and generating the sequence number to be embedded in the head or the end of the sector of the first write data based on the cumulative sequence number.

12. The test method according to claim 9, further comprising:

managing a zone write count indicating a number of times of writing for the entire storage area corresponding to the zone;

each time the zone is reset to a free state, storing a write pointer indicating a next writable logical address in the zone in a write pointer history table storing history information of a write pointer of the zone as write pointer history information; and when a first write count information table storing write count information indicating a number of times of writing for a storage location corresponding to each of the plurality of logical addresses of the zone is not present in the memory, restoring the write count information based on the zone write count and the write pointer history information.

13. The test method according to claim 12, wherein the write count information includes a write issuing count indicating a number of times a command for writing data has been issued for each logical address, and a write processing count indicating a number of times writing has been completed for each logical address, and the test method further comprises storing, in the memory, second write data to be written to a storage location corresponding to a third logical address among the plurality of logical addresses, incrementing, by one, a third write issuing count corresponding to the third logical address, stored in the first write count information table, embedding the third logical address and the incremented third write issuing count in a head or an end of a sector of the second write data stored in the memory, issuing, to the memory system, a write command for designating the third logical address and a size of the second write data and requesting writing of the second write data to the storage location corresponding to the third logical address, and incrementing, by one, a third write processing count corresponding to the third logical address, stored in the first write count information table when a response indicating completion of processing of the write command is received.

14. The test method according to claim 13, further comprising:

issuing, to the memory system, a second read command for designating the third logical address and requesting reading of data from the storage location corresponding to the third logical address; and when second read data based on the second read command is received, comparing a logical address and a write count included in a head or an end of a sector of the second read data with the third logical address and the third write processing count of the first write count information table, respectively.

15. The test method according to claim 13, further comprising:

when a second copy command for designating the third logical address as a copy source logical address, designating a fourth logical address as a copy destination logical address, and requesting copying of data written in a storage location corresponding to the copy source logical address to a storage location corresponding to the copy destination logical address is issued to the memory system, executing an operation of storing the third logical address in a third expected value table storing expected values of read data corresponding to a copy destination zone including the copy destination logical address for each logical address of the copy destination zone as a third expected value used to evaluate data integrity of read data that is read from a storage location corresponding to the fourth logical address, and an operation of storing the third write issuing count to be stored in the first write count information table in a second write count information table storing write count information indicating a number of times of writing for each logical address included in the copy destination zone as a write issuing count corresponding to the fourth logical address; and setting a write processing count corresponding to the fourth logical address to the same value as a write processing count corresponding to the third logical address when a response indicating completion of the second copy command is received.

16. The test method according to claim 9, further comprising:

when a first copy command for designating the first logical address as a copy source logical address, designating a second logical address as a copy destination logical address, and requesting copying of data written in a storage location corresponding to the copy source logical address to a storage location corresponding to the copy destination logical address, is issued to the memory system, storing the zone identifier and the sequence number in a second expected value table storing expected values of read data corresponding to a copy destination zone including the copy destination logical address as second expected values to be used to evaluate data integrity of read data read from a storage location corresponding to the second logical address.

* * * * *